United States Patent
Natarajan et al.

(10) Patent No.: US 12,351,736 B2
(45) Date of Patent: Jul. 8, 2025

(54) DIP-COAT BINDER SOLUTIONS COMPRISING METAL DIP-COAT POWDER FOR USE IN ADDITIVE MANUFACTURING

(71) Applicant: General Electric Company, Schenectady, NY (US)

(72) Inventors: Arunkumar Natarajan, Mason, OH (US); Sivaruban Shivanathan, West Chester, OH (US); Samantha Jo Rowe, West Chester, OH (US); Carlos H. Bonilla, Lebanon, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 50 days.

(21) Appl. No.: 17/500,420

(22) Filed: Oct. 13, 2021

(65) Prior Publication Data

US 2022/0145102 A1    May 12, 2022

Related U.S. Application Data

(60) Provisional application No. 63/111,340, filed on Nov. 9, 2020.

(51) Int. Cl.
  *C09D 7/61*    (2018.01)
  *B22F 10/60*    (2021.01)
  (Continued)

(52) U.S. Cl.
  CPC .............. *C09D 7/61* (2018.01); *B22F 10/60* (2021.01); *B33Y 40/20* (2020.01); *C09D 7/68* (2018.01);
  (Continued)

(58) Field of Classification Search
  CPC ...................................... C09D 7/61
  See application file for complete search history.

(56) References Cited

U.S. PATENT DOCUMENTS

2021/0362234 A1* 11/2021 Jangam ..................... B22F 1/10

FOREIGN PATENT DOCUMENTS

| KR | 100829001 B1 | 5/2008 |
|---|---|---|
| RU | 2147005 C1 | 3/2000 |

(Continued)

OTHER PUBLICATIONS

E. B. Gutoff and Edward D. Cohen, Chapter 13—Water—and solvent-based coating technology, Plastics Design Library, Multilayer Flexible Package, p. 163-184 (2010).

(Continued)

*Primary Examiner* — Jophy S. Koshy
*Assistant Examiner* — Joshua S Carpenter
(74) *Attorney, Agent, or Firm* — Dinsmore & Shohl LLP

(57) ABSTRACT

A dip-coat binder solution comprises a metal dip-coat powder and a dip-coat binder. The dip-coat binder solution has a viscosity greater than or equal to 1 cP and less than or equal to 40 cP. The metal dip-coat powder may comprise a stainless steel alloy, a nickel alloy, a copper alloy, a copper-nickel alloy, a cobalt-chrome alloy, a titanium alloy, an aluminum alloy, a tungsten alloy, or a combination thereof. A method of forming a part includes providing a green body part comprising a plurality of layers of print powder, dipping the green body part in a dip-coat binder solution to form a dip-coated green body part, and heating the dip-coated green body part. After dipping, the dip-coated green body part has a surface roughness Ra less than or equal to 10 μm.

6 Claims, 19 Drawing Sheets

(51) Int. Cl.
*B33Y 40/20* (2020.01)
*C09D 7/40* (2018.01)
*C09D 135/04* (2006.01)
*C09D 139/06* (2006.01)

(52) U.S. Cl.
CPC ............. *C09D 7/69* (2018.01); *C09D 135/04* (2013.01); *C09D 139/06* (2013.01)

(56) References Cited

FOREIGN PATENT DOCUMENTS

| WO | WO-03032084 A2 * | 4/2003 | ............. B01J 21/18 |
|----|------------------|--------|--------------------------|
| WO | 2020190276 A1 | 9/2020 | |

OTHER PUBLICATIONS

Extended European Search Report issued Mar. 17, 2022 in European Application No. 21203384.9.

* cited by examiner

DIP-COAT BINDER SOLUTIONS COMPRISING METAL DIP-COAT POWDER FOR USE IN ADDITIVE MANUFACTURING

CROSS-REFERENCE TO RELATED APPLICATIONS

The present specification claims the benefit of U.S. Provisional Application Ser. No. 63/111,340 filed Nov. 9, 2020 and entitled "Dip-coat Binder Solutions Comprising Metal Dip-coat Powder For Use In Additive Manufacturing," the entirety of which is incorporated by reference herein.

FIELD

The present specification relates to additive manufacturing. More specifically, the present specification is directed to dip-coat binder solutions comprising metal dip-coat powder for use in additive manufacturing.

TECHNICAL BACKGROUND

Additive manufacturing, also known as three-dimensional printing, is a process in which material is built up layer-by-layer to form an object. Binder jetting is an additive manufacturing technique based on the use of a print binder to join particles of a print powder to form a three-dimensional object. In particular, the print binder is jetted onto successive layers of the print powder in a build volume, where layers of the print powder and the print binder adhere to one another to form a three-dimensional object. In some applications, the printed part is suitable for end-use.

In certain applications, it may be desirable for the printed part to have a uniform surface. Conventionally, fine print powders (e.g., powders having a median particle size distribution D50 of less than or equal to 12 µm) are used to achieve relatively smooth surface finishes (e.g., Ra less than or equal to 10 µm). However, fine print powders have a high moisture content and are difficult to flow, which may result in recoating issues. Although coarse print powders (e.g., powders having a median particle size distribution D50 of greater than or equal to 25 µm) are easy to flow and recoat, the surface finishes with such print powders are modest to poor (e.g., Ra greater than 10 µm).

Accordingly, a need exists for alternative methods to impart a smooth surface finish on binder jet three-dimensional printed parts manufactured with coarse print powders.

SUMMARY

Various embodiments of dip-coat binder solutions disclosed herein meet these needs by enabling easy dip-coating to provide a surface roughness Ra less than or equal to 10 µm, including on curved surfaces.

According to a first aspect A1, a dip-coat binder solution may include: greater than or equal to 25 wt % and less than or equal to 70 wt % of a metal dip-coat powder, based on a total weight of the dip-coat binder solution, the metal dip-coat powder having a median particle size distribution greater than or equal to 0.5 µm and less than or equal to 30 µm; and a dip-coat binder, wherein the dip-coat binder solution has a viscosity greater than or equal to 1 cP and less than or equal to 40 cP.

A second aspect A2 includes the dip-coat binder solution according to the first aspect A1, wherein the dip-coat binder solution comprises greater than or equal to 30 wt % and less than or equal to 70 wt % of the metal dip-coat powder, based on a total weight of the dip-coat binder solution.

A third aspect A3 includes the dip-coat binder solution according to the first aspect A1 or the second aspect A2, wherein the metal dip-coat powder has a median particle size distribution greater than or equal to 1 µm and less than or equal to 25 µm.

A fourth aspect A4 includes the dip-coat binder solution according to any of the first through third aspects A1-A3, wherein the metal dip-coat powder comprises a stainless steel alloy, a nickel alloy, a copper alloy, a copper-nickel alloy, a cobalt-chrome alloy, a titanium alloy, an aluminum alloy, a tungsten alloy, or a combination thereof.

A fifth aspect A5 includes the dip-coat binder solution according to any of the first through fourth aspects A1-A4, wherein the dip-coat binder solution has a viscosity greater than or equal to 3 cP and less than or equal to 40 cP.

A sixth aspect A6 includes the dip-coat binder solution according to any of the first through fifth aspects A1-A5, wherein the dip-coat binder comprises an adhesive.

A seventh aspect A7 includes the dip-coat binder solution according to the sixth aspect A6, wherein the adhesive comprises cyanoacrylate, allyl cyano acrylate, n-alkyl cyanoacrylate, or a combination thereof.

An eighth aspect A8 includes the dip-coat binder solution according to any of the first through fifth aspects A1-A5, wherein the dip-coat binder comprises a thermoplastic polymer.

A ninth aspect A9, includes the dip-coat binder solution according to the eighth aspect A8, wherein the thermoplastic polymer has an average molecular weight greater than or equal to 7,000 g/mol and less than or equal to 50,000 g/mol.

A tenth aspect A10 includes the dip-coat binder solution according to the eighth aspect A8 or the ninth aspect A9, wherein the thermoplastic polymer is selected from the group consisting of polystyrene (PS), polyvinyl pyrrolidone (PVP), polyvinyl alcohol (PVA), polycarbonate (PC), polyacrylic acid (PAA), derivatives thereof, and combinations thereof.

An eleventh aspect A11 includes the dip-coat binder solution according to any of the first through tenth aspects A1-A10, wherein a weight ratio of the metal dip-coat powder to the dip-coat binder is greater than or equal to 1:4 and less than or equal to 3:1.

According to a twelfth aspect A12, a coated green body part may include: a green body part comprising a plurality of layers of print powder; and a metal powder coating on an outer surface of the green body part, the metal powder coating comprising: greater than or equal to 25 wt % and less than or equal to 70 wt % of metal dip-coat powder, based on a total weight of the metal powder coating, the metal powder coating having a mean particle diameter greater than and equal to 0.5 µm to less than or equal to 30 µm; and a dip-coat binder, wherein the metal powder coating has a surface roughness Ra less than or equal to 10 µm A thirteenth aspect A13 includes the coated green body part according to the twelfth aspect A12, wherein the metal dip-coat powder comprises a stainless steel alloy, a nickel alloy, a copper alloy, a copper-nickel alloy, a cobalt-chrome alloy, a titanium alloy, an aluminum alloy, a tungsten alloy, or a combination thereof, and the print powder comprises a nickel alloy, a cobalt alloy, a cobalt-chromium alloy, a titanium alloy, an aluminum-based material, tungsten, stainless steel, or a combination thereof.

A fourteenth aspect A14 includes the coated green body part according to the twelfth aspect A12 or the thirteenth aspect A13, wherein the dip-coat binder comprises cyanoacrylate, ally cyano acrylate, n-alkyl cyanoacrylate, or a combination thereof.

A fifteenth aspect A15 includes the coated green body part according to any of the twelfth through fourteenth aspects A12-A14, wherein the dip-coat binder is selected from the group consisting of polystyrene (PS), polyvinyl pyrrolidone (PVP), polyvinyl alcohol (PVA), polycarbonate (PC), polyacrylic acid (PAA), derivatives thereof, and combinations thereof.

According to a sixteenth aspect A16, a method of forming a part may include: providing a green body part comprising a plurality of layers of print powder; dipping the green body part in a dip-coat binder solution to form a dip-coated green body part, the dip-coat binder solution having a viscosity greater than or equal to 1 cP and less than or equal to 40 cP and comprising: greater than or equal to 25 wt % and less than or equal to 70 wt % of a metal dip-coat powder, based on a total weight of the dip-coat binder solution, the metal dip-coat powder having a median particle size distribution greater than or equal to 0.5 μm and less than or equal to 30 μm; and a dip-coat binder; and heating the dip-coated green body part, wherein after the dipping, the dip-coated green body part has a surface roughness Ra less than or equal to 10 μm.

A seventeenth aspect A17 includes the method according to the sixteenth aspect A16, wherein heating the dip-coated green body part comprises heating the dip-coated green body part to a first temperature greater than or equal to 50° C. and less than or equal to 200° C. to form a metal powder coating on an outer surface of the green body part.

An eighteenth aspect A18 includes the method according to the sixteenth aspect A16 or the seventeenth aspect A17, wherein heating the dip-coated green body part further comprises heating the dip-coated green body part to a second temperature greater than or equal to 200° C. and less than or equal to 1400° C. to sinter the metal dip-coat powder and print powder thereby forming a consolidated part with a metallic outer surface.

A nineteenth aspect A19 includes the method according to the eighteenth aspect A18, wherein the consolidated part has a surface roughness Ra less than or equal to 8 μm.

A twentieth aspect A20 includes the method according to any of the sixteenth through nineteenth aspects A16-A19, wherein the metal dip-coat powder comprises a stainless steel alloy, a nickel alloy, a copper alloy, a copper-nickel alloy, a cobalt-chrome alloy, a titanium alloy, an aluminum alloy, a tungsten alloy, or a combination thereof.

Additional features and advantages of the embodiments disclosed herein will be set forth in the detailed description, which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
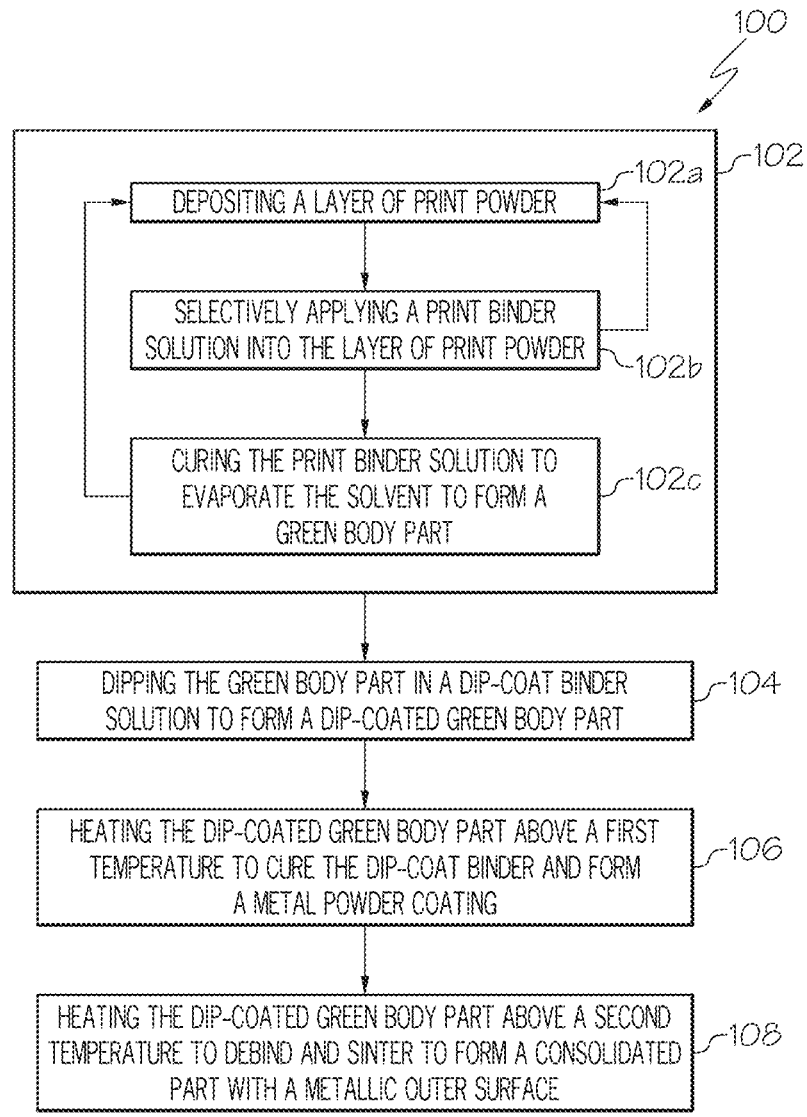
FIG. 1 is a flow diagram of an embodiment of a method of manufacturing a consolidated part using the dip-coat binder solution according to one or more embodiments described herein.

Reference will now be made in detail to various embodiments of metallic particle-containing dip-coat binder solutions for use in additive manufacturing.

In particular, various embodiments of metal dip-coat powder-containing binder solutions comprise greater than or equal to 25 wt % and less than or equal to 70 wt % of metal dip-coat powder and a dip-coat binder. Various embodiments of dip-coat binder solutions comprising metal dip-coat powder and use of such dip-coat binder solutions in additive manufacturing will be referred to herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The phrase "surface roughness ('Ra')," as used herein, refers to the surface texture of a printed part quantified by the arithmetic average of the absolute values of the profile height deviations from the mean line, recorded within the evaluation length, as measured in accordance with ASTM D7127-17. Values reported herein are reported in microns, or μm, unless otherwise expressly stated.

The phrase "particle size distribution," as used herein, refers to the distribution of particle sizes present in the powder.

The phrase "particle size distribution D50," as used herein, refers to the value of the particle diameter at 50% in the cumulative distribution. Particle size distribution D50 is sometimes referred to herein as "median particle size distribution."

The phrase "reactive dip-coat binder," as used herein, refers to a dip-coat binder that crosslinks upon exposure to an initiator (e.g., moisture or thermal initiators).

The phrase "non-reactive dip-coat binder," as used herein, refers to a dip-coat binder composed of thermoplastic polymers dissolved in a secondary solvent that crosslinks without the need for an initiator.

The phrase "thermoplastic polymer," as used herein, refers to a polymer that includes one or more polymer strands having functional groups that may interact with powder particles to adhere them to the part surface after the solvent is removed.

The parameter "viscosity" of the dip-coat binder solution, as discussed herein, is measured using a rheometer in accordance with ASTM E3116.

The term "debinding," as used herein, refers to heating the green body part having a metal powder coating such that the print binder in the bulk and dip-coat binder are removed.

The term "sintering," as used herein, refers to heating the green body part to sinter and form a consolidated part. For example, sintering a green body part having a metal powder coating to sinters the print powder and the metal dip-coat powder, thereby forming a consolidated part with a metallic outer surface.

The phrase "green body part," as used herein, refers to a printed part that has not undergone heat treatment to remove the print binder.

The phrase "metal powder coating," as used herein, refers to the coating on an outer surface of the green body part that results after dipping the green body part in the dip-coat binder solution and subjecting the dip-coated green body part to a curing heat treatment.

The phrase "metallic outer surface," as used herein, as used herein, refers to the outer surface of a consolidated part after the dip-coated green body part is subjected to a debinding and sintering heat treatment.

In additive manufacturing processes including binder jetting, a print binder solution is jetted from a printhead onto successive layers of a powder to join particles of a powder to form a printed three-dimensional part. As discussed hereinabove, binder jet three-dimensional printing generally does not produce objects with smooth surface finishes on all surfaces. In embodiments, a surface roughness Ra less than or equal to 10 μm may be desired, such as for parts like turbo housing, airfoils, and shrouds in automotive and aerospace applications.

However, conventional methods used to accomplish a surface roughness Ra of less than or equal to 10 μm have deficiencies. For example, while fine print powders (e.g., particle size distribution D50 less than or equal to 12 μm) may result in a surface roughness Ra of less than or equal to 10 μm, fine print powders are difficult to handle and recoat. On the other hand, although coarser print powders (e.g., particle size distribution D50 greater than or equal to 25 μm) are easy to handle and recoat, the surface roughness Ra achieved with such powders is greater than 10 μm. Therefore, handling capabilities may be sacrificed for a surface roughness Ra of less than or equal to 10 μm or vice versa. Bimodal print powders (i.e., including both fine and coarse print powders) are easy to handle and recoat like coarse print powders and may have a relatively reduced surface roughness like fine print powders. However, bimodal print powders do not achieve a consistent surface roughness Ra of less than or equal to 10 μm.

Accordingly, various embodiments of dip-coat binder solutions disclosed herein have a relatively low viscosity (e.g., less than 40 cP) that enables easy dip-coating to provide a surface roughness Ra less than or equal to 10 μm, including on curved surfaces.

In various embodiments, the dip-coat binder solutions described herein comprise metal dip-coat powder and a dip-coat binder. The low viscosity of the dip-coat binder solution enables uniform coating of the dip-coat binder solution on the green body part. In particular, the dip-coat binder solution reduces the porosity of the outer surface of the green body part generated by uneven three-dimensional printing across different curved and angular surfaces. The dip-coat binder bonds the metal dip-coat powder to itself and the green body part to fill in the rough cavities of the printed green body part. In embodiments, the dip-coated green body part is subjected to a curing heat treatment to transform the dip-coat binder solution into a metal powder coating on an outer surface of the green body part, the metal powder coating having a surface roughness Ra less than or equal to 10 μm. The dip-coated green body part is subjected to a debinding and sintering heat treatment to form a consolidated part with a metallic outer surface having a surface roughness Ra less than or equal to 8 μm. The surface roughness Ra of the metallic outer surface may be even lower than the surface roughness Ra of the metal powder coating because, during debinding and sintering, the print powder and metal-dip coat powder are sintered simultaneously. This sintering shrinks the overall geometry and transforms the metal powder coating into a metallic outer coating on the external surface while homogenizing to form a uniform microstructure with the bulk printed part and consolidation to a final sintered part having the even lower surface roughness Ra.

In embodiments, the metal dip-coat powder may comprise a stainless steel alloy (e.g., Grade 316, Grade 304, Grade 17-4PH, Grade 8620, and Grade 4140), a nickel alloy (e.g., Inconel 625, Rene' 108, and Rene' 80), a copper alloy, a copper-nickel alloy, a cobalt-chrome alloy, a titanium alloy, an aluminum alloy, a tungsten alloy, or a combination thereof. In embodiments, the metallic particle material depends on the print powder. For example, nickel alloy metal dip-coat powder may be used with print powder comprising stainless steel or nickel alloys.

In embodiments, the metal dip-coat powder has a median particle size distribution greater than or equal to 0.5 μm and less than or equal to 30 μm. In embodiments, the metal dip-coat powder may have a median particle size distribution greater than or equal to 0.5 μm, greater than or equal to 1 μm, greater than or equal to 5 μm, or even greater than or equal to 10 μm. In embodiments, the metal dip-coat powder may have a median particle size distribution less than or equal to 30 μm, less than or equal to 25 μm, less than or equal to 20 μm, or even less than or equal to 15 μm. For example, the metal dip-coat powder may have a median particle size greater than or equal to 0.5 μm and less than or equal to 30 μm, greater than or equal to 0.5 μm and less than or equal to 25 μm, greater than or equal to 0.5 μm and less than or equal to 20 μm, greater than or equal to 0.5 μm and less than or equal to 15 μm, greater than or equal to 1 μm and less than or equal to 30 μm, greater than or equal to 1 μm and less than or equal to 25 μm, greater than or equal to 1 μm and less than or equal to 20 μm, greater than or equal to 1 μm and less than or equal to 15 μm, greater than or equal to 5 μm and less than or equal to 30 μm, greater than or equal to 5 μm and less than or equal to 25 μm, greater than or equal to 5 μm and less than or equal to 20 μm, greater than or equal to 5 μm and less than or equal to 15 μm, greater than or equal to 10 μm and less than or equal to 30 μm, greater than or equal to 10 μm and less than or equal to 25 μm, greater than or equal to 10 μm and less than or equal to 20 μm, or even greater than or equal to 10 μm and less than or equal to 15 μm, or any and all sub-ranges formed from any of these endpoints.

The metal dip-coat powder is included in the dip-coat binder solution in amounts such that the viscosity of the dip-coat binder solution is relatively low (e.g., greater than or equal to 1 cP and less than or equal to 40 cP) to enable uniform coating of the dip-coat binder solution on the green body part. In embodiments, the dip-coat binder solution comprises greater than or equal to 25 wt % and less than or equal to 70 wt % of the metal dip-coat powder, based on a total weight of the dip-coat binder solution. In embodiments, the dip-coat binder solution comprises greater than or equal to 30 wt % and less than or equal to 70 wt % of the metal dip-coat powder, based on a total weight of the dip-coat binder solution. In embodiments, the dip-coat binder solution may comprise greater than or equal to 25 wt %, greater than or equal to 35 wt %, or even greater than or equal to 45 wt % of the metal dip-coat powder, based on a total weight of the dip-coat binder solution. In embodiments, the dip-coat binder solution may comprise less than or equal to 70 wt %, less than or equal to 60 wt %, or even less than or equal to 50 wt % of the metal dip-coat powder, based on a total weight of the dip-coat binder solution. For example, the dip-coat binder solution may comprise greater than or equal to 25 wt % and less than or equal to 70 wt %, greater than or equal to 25 wt % and less than or equal to 60 wt %, greater than or equal to 25 wt % and less than or equal to 50 wt %, greater than or equal to 35 wt % and less than or equal to 70 wt %, greater than or equal to 35 wt % and less than or equal to 60 wt %, greater than or equal to 35 wt % and less than or equal to 50 wt %, greater than or equal to 45 wt % and less than or equal to 70 wt %, greater than or equal to 45 wt % and less than or equal to 60 wt %, or even greater than or equal to 45 wt % and less than or equal to 50 wt %, or any and all sub-ranges formed from any of these endpoints of metal dip-coat powder, based on a total weight of the dip-coat binder solution.

The dip-coat binder solution further includes a dip-coat binder. The dip-coat binder bonds the metal dip-coat powder to itself and the green body part to fill in the rough cavities of the printed green body part and thereby provide a surface roughness Ra less than or equal to 10 μm on the green body part. The dip-coat binder bonds the metal dip-coat powder to itself and the green body part without any phase separation or skinning effect. In embodiments, the dip-coat binder may be cleanly and readily removed during debinding and sintering to generate a consolidate part that is substantially free of the dip-coat binder and decomposition products (e.g., char and metal oxides).

In embodiments, the dip-coat binder comprises a reactive dip-coat binder. In embodiments, upon dipping the green body part into the dip-coat binder solution, the reactive dip-coat binder reacts with water present on an outer surface of the green body part, or another initiator present or added, to initiate crosslinking of the reactive dip-coat binder. In embodiments, crosslinking of the reactive dip-coat binder bonds the metal dip-coat powder to itself and the green body part to fill in the rough cavities of the printed green body part. In embodiments, curing the dip-coated green body part initiates further crosslinking of the reactive dip-coat binder, resulting in efficient bonding of the metal dip-coat powder by the reactive dip-coat binder and formation of a metal powder coating on the green body part having a surface roughness Ra less than or equal to 10 μm.

In embodiments, the reactive dip-coat binder comprises an adhesive. In embodiments, the adhesive comprises cyanoacrylate, allyl cyano acrylate, n-alkyl cyanoacrylate, or a combination thereof. In embodiments, the reactive dip-coat binder comprises a non-adhesive. In embodiments, the non-adhesive comprises hexanediol diacrylate (HDDA), diethyleneglycol vinyl ether, vinyl pyrrolidone, or a combination thereof.

In embodiments, the dip-coat binder comprises a non-reactive dip-coat binder. In embodiments, curing the dip-coated green body part cures and crosslinks the non-reactive dip-coat binder. For example, in the curing step, solvent present in the dip-coat binder solution may be evaporated, which allows for efficient bonding of the metal dip-coat powder to itself and the green body part by the non-reactive dip-coat binder via weak non-covalent forces and formation of a metal powder coating on the green body part having a surface roughness Ra less than or equal to 10 μm.

In embodiments, the non-reactive dip-coat binder comprises a thermoplastic polymer.

In embodiments, the average molecular weight (Mw or weight average) of the first polymer strand may be adjusted to help achieve the desired dip-coat binder solution viscosity. In embodiments, the thermoplastic polymer in the dip-coat binder has an average molecular weight greater than or equal to 7,000 g/mol and less than or equal to 50,000 g/mol. For example, the thermoplastic polymer may have an average molecular weight greater than or equal to 7,000 g/mol and less than or equal to 50,000 g/mol, greater than or equal to 7,000 g/mol and less than or equal to 30,000 g/mol, greater than or equal to 7,000 g/mol and less than or equal to 25,000 g/mol, greater than or equal to 7,000 g/mol and less than or equal to 23,000 g/mol, greater than or equal to 9,000 g/mol and less than or equal to 50,000 g/mol, greater than or equal to 9,000 g/mol and less than or equal to 30,000 g/mol, greater than or equal to 9,000 g/mol and less than or equal to 25,000 g/mol, greater than or equal to 9,000 g/mol and less than or equal to 23,000 g/mol, greater than or equal to 13,000 g/mol and less than or equal to 50,000 g/mol, greater than or equal to 13,000 g/mol and less than or equal to 30,000 g/mol, greater than or equal to 13,000 g/mol and less than or equal to 25,000 g/mol, greater than or equal to 13,000 g/mol and less than or equal to 23,000 g/mol, greater than or equal to 23,000 and less than or equal to 50,000 g/mol, greater than or equal to 23,000 g/mol and less than or equal to 30,000 g/mol, greater than or equal to 23,000 g/mol and less than or equal to 25,000 g/mol, greater than or equal to 25,000 g/mol and less than or equal to 50,000 g/mol, greater than or equal to 25,000 g/mol and less than or equal to 30,000 g/mol, or even greater than or equal to 30,000 g/mol and less than or equal to 50,000 g/mol, or any and all sub-ranges formed from any of these endpoints.

In embodiments, the thermoplastic polymer includes one or more polymers such as, but not limited to, polystyrene (PS), polyvinyl pyrrolidone (PVP), polyvinyl alcohol (PVA), polycarbonate (PC), polyacrylic acid (PAA), derivatives thereof, and combinations thereof.

The dip-coat binder is included in the dip-coat binder solution in amounts such that the viscosity of the dip-coat binder solution is relatively low (e.g., greater than or equal to 1 cP and less than or equal to 40 cP) to enable uniform coating of the dip-coat binder solution on the green body part. Accordingly, in embodiments, the dip-coat binder solution comprises greater than or equal to 30 wt % and less than or equal to 75 wt % of the dip-coat binder, based on a total weight of the dip-coat binder solution. In embodiments, the dip-coat binder solution may comprise greater than 30 wt %, greater than or equal to 40 wt %, greater than or equal to 50 wt %, or even greater than or equal to 55 wt % of the dip-coat binder, based on a total weight of the dip-coat binder solution. In embodiments, the dip-coat binder solution may comprise less than or equal to 75 wt % or even less than or equal to 65 wt % of the dip-coat binder, based on a total weight of the dip-coat binder solution. For example, the dip-coat binder solution may comprise greater than or equal to 30 wt % and less than or equal to 75 wt %, greater than or equal to 30 wt % and less than or equal to 65 wt %, greater than or equal to 40 wt % and less than or equal to 75 wt %, greater than or equal to 40 wt % and less than or equal to 65 wt %, greater than or equal to 50 wt % and less than or equal to 75 wt %, greater than or equal to 50 wt % and less than or equal to 65 wt %, greater than or equal to 55 wt % and less than or equal to 75 wt %, or even greater than or equal to 55 wt % and less than or equal to 65 wt %, or any and all sub-ranges formed from any of these endpoints of the dip-coat binder, based on a total weight of the dip-coat binder solution.

The metal dip-coat powder and the dip-coat binder are included in the dip-coat binder solution in amounts such that the viscosity of the dip-coat binder solution is relatively low to enable uniform coating of the dip-coat binder solution on the green body part. In embodiments, the weight ratio of the metal dip-coat powder to the dip-coat binder is greater than or equal to 1:4 and less than or equal to 1:1. For example, the weight ratio of the metal dip-coat powder to the dip-coat binder may be 1:4, 1:2, 3:5, 3:4, or 1:1.

The dip-coat binder solution may further include a solvent. For example, the dip-coat binder solution may include metal dip-coat powder, a non-reactive dip-coat binder (e.g., thermoplastic polymer), and a solvent. The solvent may be aqueous or non-aqueous depending on the selected thermoplastic polymer and other additives, if any, included in the dip-coat binder solution. In embodiments in which the green body part is printed with a water-based print binder, the solvent may be non-aqueous. Green body parts printed with water-based print binders may dissolve if dipped in an aqueous dip-coat binder solution. In embodiments, the solvent is generally non-reactive (e.g., inert) such that it does not react with the metal dip-coat powder, the dip-coat binder, or any other additives that may be in the dip-coat binder solution. In embodiments, at least a portion of the solvent may readily evaporate after dipping of the green body part into the dip-coat binder solution and facilitate bonding of the metal dip-coat powder to itself and the green body part.

In embodiments, the solvent may be, by way of example and not limitation, water, 2-methoxy ethanol, butanol, 1-methoxy-2-propanol, 2-butoxy ethanol, ethylene glycol, ethylene glycol butyl ether, diethylene glycol, tetrahydrofuran (THF), methyl ethyl ketone (MEK), or combinations thereof. In embodiments, the solvent may be present in the dip-coat binder solution in an amount greater than or equal to 1 wt % and less than or equal to 50 wt %, greater than or equal to 1 wt % and less than or equal to 25 wt %, greater than or equal to 1 wt % and less than or equal to 10 wt %, greater than or equal to 10 wt % and less than or equal to 50 wt %, greater than or equal to 10 wt % and less than or equal to 25 wt %, or even greater than or equal to 25 wt % and less than or equal to 50 wt %, or any and all sub-ranges formed from any of these endpoints, based on a total weight of the dip-coat binder solution.

In embodiments, the viscosity of the dip-coat binder solution may be adjusted depending on the specific application of the dip-coat binder solution. A fluid with a relatively low viscosity (e.g., less than or equal to 40 cP) has a low resistance, shears easily, and flows quickly. A fluid with a relatively high viscosity (e.g., greater than 40 cP) moves sluggishly and resists deformation. Accordingly, the viscosity of the dip-coat binder solution should be sufficiently high (e.g., greater than or equal to 1 cP) to form a coating. However, the viscosity of the dip-coat binder solution should be kept relatively low (e.g., less than or equal to 40 cP) to ensure uniform coating of the dip-coat binder solution on all surfaces of the green body part.

In embodiments, the dip-coat binder solution has a viscosity greater than or equal to 1 cP and less than or equal to 40 cP. In embodiments, the viscosity of the dip-coat binder solution may be greater than or equal to 1 cP, greater than or equal to 3 cP, or even greater than or equal to 5 cP. In embodiments, the viscosity of the dip-coat binder solution may be less than or equal to 40 cP, less than or equal to 30 cP, or even less than or equal to 20 cP. For example, the viscosity of the dip-coat binder solution may be greater than or equal to 1 cP and less than or equal to 40 cP, greater than or equal to 1 cP and less than or equal to 30 cP, greater than or equal to 1 cP and less than or equal to 20 cP, greater than or equal to 3 cP and less than or equal to 40 cP, greater than or equal to 3 cP and less than or equal to 30 cP, greater than or equal to 3 cP and less than or equal to 20 cP, greater than or equal to 5 cP and less than or equal to 40 cP, greater than or equal to 5 cP and less than or equal to 30 cP, or even greater than or equal to 5 cP and less than or equal to 20 cP, or any and all sub-ranges formed from any of these endpoints.

In embodiments, the dip-coat binder solution may optionally include one or more additives to adjust the viscosity of the dip-coat binder solution or to otherwise ensure uniform coating of the green body part. Optional additives include surfactants, diluents, viscosity or rheology modifiers, dispersants, stabilizers, or any other additive. In embodiments, the surfactants may be ionic (e.g., zwitterionic, cationic, anion) or non-ionic depending on the properties of the dip-coat binder and/or the metal dip-coat powder. In embodiments, the surfactant may comprise polypropoxy quaternary ammonium chloride (e.g., VARIQUAT™ CC 42 NS available from Evonik Industries), oligomers of hexanoic acid, alkylene oxide copolymer (e.g., HYPERMER™ KD2 available from Croda Advanced Materials), alkylene esters of fatty acids and alkylamines, 2-[4-(2,4,4-trimethylpentan-2-yl)phenoxy]ethanol (e.g., TRITON' X-100 available from The Dow Chemical Company), polyoxyethylene (80) sorbitan monooleate (e.g., TWEEN™ 80 available from Croda Americas, Inc.), polyoxyethylene-23-lauryl ether (e.g., BRIJ™ L23 available from Croda Americas, Inc.), sodium dodecyl sulfate (SDS), hexadecyltrimethylammonium bromide (CTAB), dodecyltrimethylammonium bromide (DTAB), or a combination thereof.

In embodiments, the dip-coat binder solution may be prepared by adding metal dip-coat powder to a dip-coat binder and stirring the metal dip-coat powder and dip-coat binder with, for example, a blender blade or magnetic stirrer. The dip-coat binder solution may be, for example, any one of the embodiments of the dip-coat binder solution described herein, comprising metal dip-coat powder and a dip-coat binder. In embodiments, the particular dip-coat binder solution is selected based at least in part on the print powder used to form the layer of print powder. In embodiments, the metal dip-coat powder of the dip-coat binder solution and the print powder may comprise one or more of the same elements. For example, in embodiments in which the print powder comprises a metal print powder comprising a nickel alloy, a cobalt alloy, a cobalt-chromium alloy, a titanium alloy, an aluminum-based material, tungsten, stainless steel, or a combination thereof, the metal dip-coat powder may comprise a stainless steel alloy, a nickel alloy, a copper alloy, a copper-nickel alloy, a cobalt-chrome alloy, a titanium alloy, an aluminum alloy, a tungsten alloy, or a combination thereof. In embodiments in which the print powder is a metal print powder comprising nickel, the metal dip-coat powder may comprise nickel alloy.

Referring now to FIG. 1, a method of manufacturing a consolidated part via additive manufacturing using the dip-coat binder solution according to embodiments described herein is shown at 100. To facilitate discussion of aspects of the method 100, reference is also made to FIG. 2, which is a block diagram depicting an embodiment of an additive manufacturing apparatus 120 that may be used to perform the method 100. The method 100 begins at block 102 with providing a green body part. The green body part may be provided by any method known to one of ordinary skill in the art.

Figure 3:
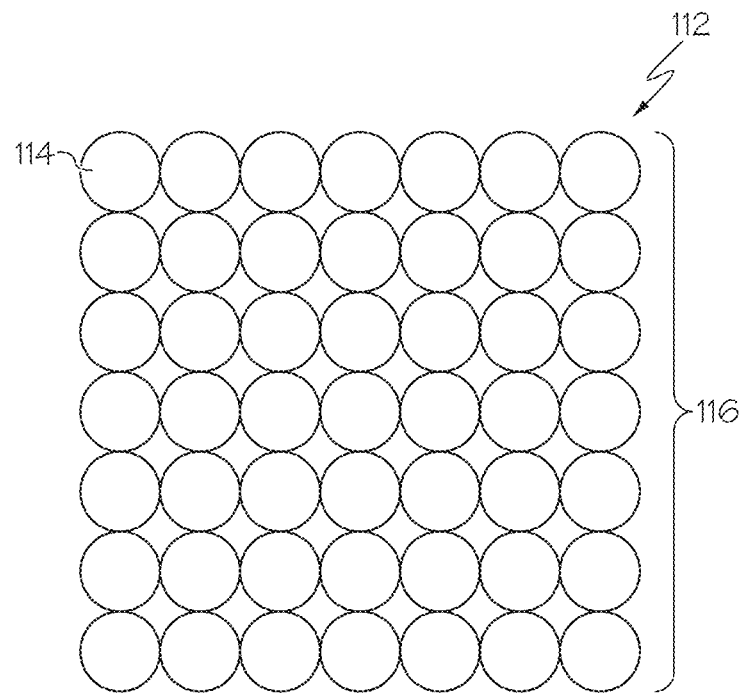
FIG. 3 is a schematic view of a layer of print powder from which a part is manufactured according to one or more embodiments shown and described herein.

For example, the step 102 of providing a green body part may begin at block 102a with depositing a layer 112 of a print powder 114 (e.g., creating a powder bed), as shown in FIG. 3, on a working surface. In embodiments, the layer 112 may have a thickness 116 greater than or equal to 10 microns (μm) and less than or equal to 200 μm. The print powder 114 used to print the part may vary depending on the type of part and the end use of the part.

In particular, the print powder 114 may include a metal print powder, such as a nickel alloy (e.g., Inconel 625, Inconel 718, Rene' 108, Rene'80, Rene'142, Rene' 195, and Rene'M2, Marm-247), a cobalt alloy (e.g., Hans 188, L605, X40, X45, and FSX414), a cobalt-chromium alloy, a titanium alloy, an aluminum-based alloy, a tungsten alloy, a stainless steel alloy, or a combination thereof. In embodiments, the metal print powder may comprise particles having a particle size distribution greater than or equal to 1 microns (μm) and less than or equal to 75 μm. Such print powders may be used to print metal articles including, by way of example and not limitation, fuel tips, fuel nozzles, shrouds, micro mixers, or turbine blades.

In embodiments, the print powder 114 may include a ceramic print powder, such as alumina, aluminum nitride, zirconia, titania, silica, silicon nitride, silicon carbide, boron nitride, or a combination thereof. In embodiments, the ceramic print powder may comprise particles having a particle size distribution greater than or equal to 0.1 μm and less than or equal to 100 μm. Such print powders may be used to print ceramic articles for use in, by way of example and not limitation, the medical and transportation industries.

Referring back to FIG. 1 at block 102b, following the deposition of print powder 114, the step 102 continues with selectively depositing a print binder solution into a portion of the layer 112 according to a pattern. For example, the print binder solution may be selectively printed into the layer 112 of print powder 114 using a printer head that is operated by a controller based on a CAD design that includes a representation of a layer of the consolidated part being printed.

Figure 2:
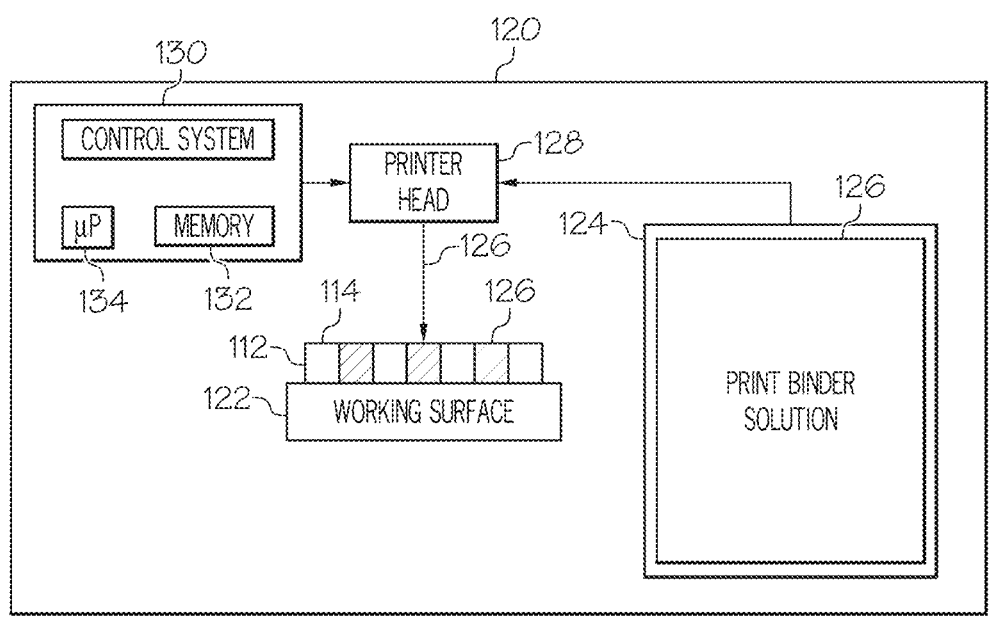
FIG. 2 is a block diagram of an additive manufacturing apparatus according to one or more embodiments shown and described herein.

For example, as shown in FIG. 2, the additive manufacturing apparatus 120 may be a binder jet printer that selectively deposits the print binder solution into the layer 112 according to the acts of block 102b (FIG. 1). In embodiments, the additive manufacturing apparatus 120 includes a working surface 122 that supports the layer 112 of print powder 114, a reservoir 124 that stores a print binder solution 126, and a printer head 128 that is fluidly coupled to the reservoir 124. The printer head 128 selectively deposits the print binder solution 126 into the layer 112 of print powder 114 to print the print binder solution 126 onto and into the layer 112 in a pattern that is representative of a layer of the consolidated part being printed. In embodiments, the additive manufacturing apparatus 120 includes a control system 130 for controlling operation of the additive manufacturing apparatus 120. The control system 130 may include a distributed control system (DCS) or any computer-based workstation that is fully or partially automated. In embodiments, the control system 130 may be any suitable device employing a general purpose computer or an application-specific device, which may generally include memory circuitry 132 storing one or more instructions for controlling operation of the additive manufacturing apparatus 120. The memory circuitry 132 may store CAD designs representative of a structure of the consolidated part being printed. The processor may include one or more processing devices (e.g., microprocessor 134), and the memory circuitry 132 may include one or more tangible, non-transitory, machine-readable media collectively storing instructions executable by the processor to control actions described herein.

After deposition, the print binder solution 126 at least partially coats an outer surface of the print powder 114, thereby generating binder-coated particles.

The step 102 may repeat the acts of blocks 102a and 102b to continue building up the part in a layer-by-layer manner until a desired number of layers 112 have been printed.

Figure 4:
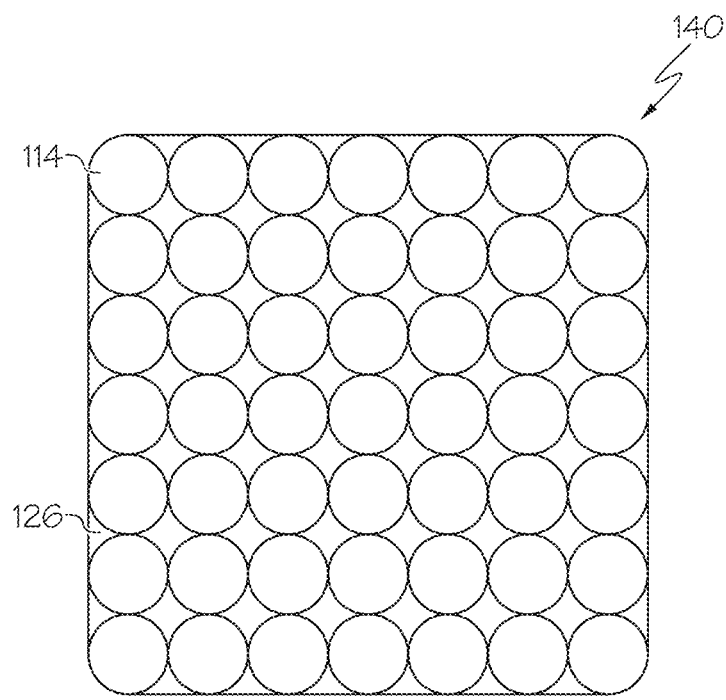
FIG. 4 is a schematic view of a green body part according to one or more embodiments shown and described herein.

As shown in FIG. 4, following deposition of the layer 112 and printing of the print binder solution 126 as set forth in blocks 102a and 102b of FIG. 1, the method 100 continues at block 102c with curing the print binder solution 126 to form a green body part 140. For example, the print binder solution 126 may include a solvent. While a portion of the solvent in the print binder solution 126 may be evaporated during deposition (e.g., printing) of the print binder solution 126, a certain amount of the solvent may remain within the layer 112 of the print powder 114. Therefore, in embodiments, the print binder solution 126 may be thermally cured at a temperature that is suitable for evaporating the solvent remaining in the printed layer 112 and allowing efficient bonding of the printed layers 112, thereby forming the green body part 140.

Heat may be applied to the printed part using an IR lamp and/or heated plate (e.g., on-machine), or may be carried out by placing the printed part in an oven (e.g., off-machine). In embodiments, curing the print binder solution 126 on-machine comprises heating the printed layers 112 at a temperature greater than or equal to 25° C. and less than or equal to 100° C., greater than or equal to 30° C. and less than or equal to 90° C., greater than or equal to 35° C. and less than or equal to 80° C., or even greater than or equal to 40° C. and less than or equal to 70° C., or any and all sub-ranges formed from any of these endpoints. In embodiments, temperature ranges for heating the printed layer 112 on-machine may differ from off-machine temperature ranges.

Unbound particles from the powder layer (e.g., the print powder 114 that is not bonded by the print binder solution 126) may be removed after curing to prepare the green body part 140 for post-printing steps, such as dipping, curing, debinding, and sintering.

After curing, the green body part 140 may undergo an optional drying step (not shown) to remove any residual solvent and/or other volatile materials that may remain in the green body part 140. For example, the green body part 140 may be dried in a vacuum, under an inert atmosphere (e.g., nitrogen ($N_2$), or argon (Ar)) or in air at slightly elevated or room temperatures.

Although one particular embodiment of an additive manufacturing apparatus 120 has been described herein, it is contemplated that the dip-coat binder solutions described herein can be used in conjunction with other additive manufacturing devices. Accordingly, the embodiments described herein are not necessarily limited to the method of making a green body part described herein.

Figure 5:
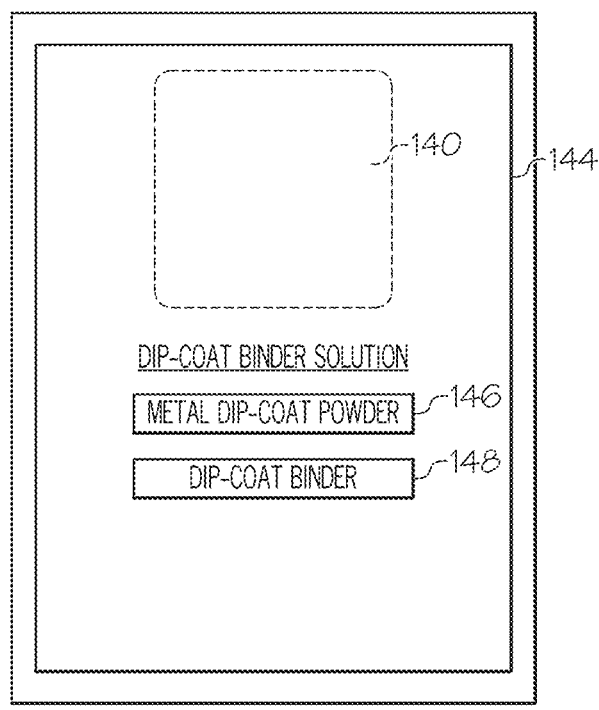
FIG. 5 is a schematic view of a green body part being dipped according to one or more embodiments shown and described herein.

Following providing the green body part 140, the method 100 continues at block 104 of FIG. 1 with dipping the green body part 140 in a dip-coat binder solution 144, as shown in FIG. 5. The green body part 140 may be dipped in or covered with the dip-coat binder solution 144 using any method known to one of ordinary skill in the art. For example, the green body part 140 may be placed in a net screen, dipped in the dip-coat binder solution 144, and lifted out of the dip-coat binder solution 144. In embodiments, the dip-coat binder solution 144 is uniformly mixed and/or stirred with, for example, a blender blade or magnetic stirrer, while the green body part 140 is dipped into the dip-coat binder solution 144 to ensure uniform coating of the metal dip-coat powder 146 and dip-coat binder 148 on the green body part 140.

Figure 6:
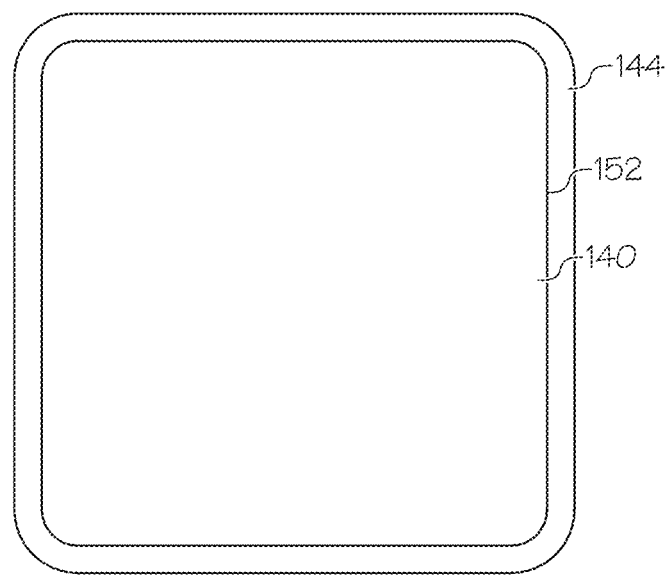
FIG. 6 is a schematic view of a dip-coated green body part according to one or more embodiments shown and described herein.

Referring now to FIG. 6, the dip-coat binder solution 144 at least partially coats an outer surface 152 of the green body part 140, thereby forming a dip-coated green body part 140. In embodiments in which the dip-coat in the dip-coat binder solution 144 is a reactive dip-coat binder, water present on the outer surface 152 of the green body part 140 or the presence or addition of other initiators may initiate cross-linking of the reactive dip-coat binder. In embodiments, crosslinking of the reactive dip-coat binder bonds the metal dip-coat powder to each and the green body part to fill in the rough cavities of the printed green body part.

In embodiments, the act of block 104 may be repeated to continue adding additional layers of the dip-coat binder solution 144 until a desired number of layers have been added.

In embodiments, the green strength of the green body part 140 is not compromised by the dip-coat binder solution 144. In embodiments, the green strength of the green body part 140 is equal to the green strength of the dip-coated green body part 140. In embodiments, the green body part 140 increases the green strength of the green body part 140. In embodiments, the green strength of the dip-coated green body part 140 is greater than or equal to 7 MPa.

Figure 7:
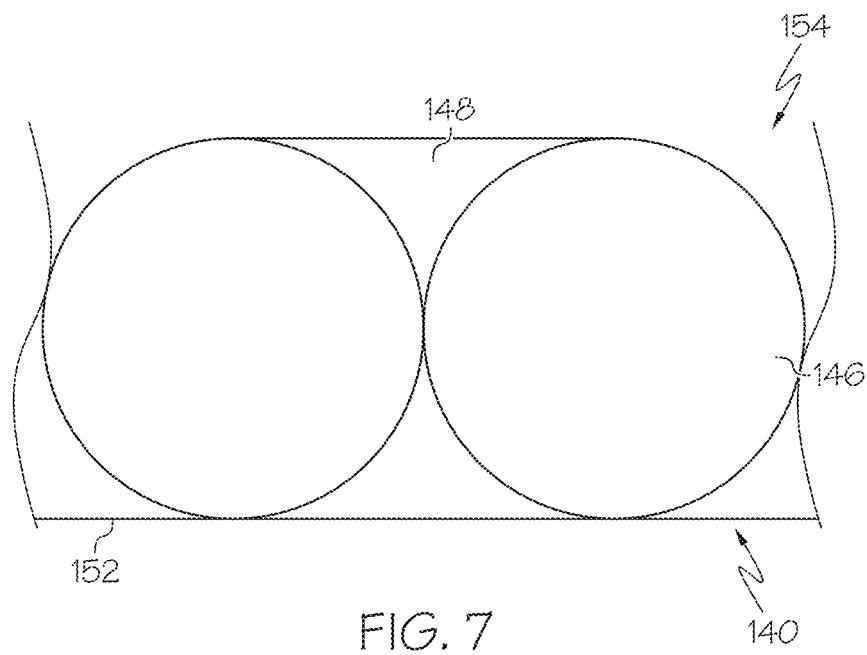
FIG. 7 is a schematic view of a green body part having a metal powder coating according to one or more embodiments shown and described herein.

The method 100 of FIG. 1 continues at block 106 with heating the dip-coated green body part 140 to a first temperature to cure the dip-coat binder solution 144 and form a metal powder coating 154 on an outer surface 152 of the green body part 140, as shown in FIG. 7. The dip-coat binder 148 of the dip-coat binder solution 144 bonds the metal dip-coat powder 146 to itself and the green body part 140 to fill in the rough cavities of the printed green body part and thereby provide a metal powder coating 154 having a surface roughness less Ra less than or equal to 10 µm. In embodiments in which the dip-coat binder 148 in the dip-coat binder solution 144 is a reactive dip-coat binder, heating the dip-coated green body part 140 to a first temperature may further crosslink the reactive dip-coat binder. In embodiments in which the dip-coat binder 148 in the dip-coat binder solution 144 is a non-reactive dip-coat binder, heating the dip-coated green body part 140 to a first temperature cures and crosslinks the non-reactive dip-coat binder. For example, as discussed hereinabove, in embodiments, the dip-coat binder solution 144 is a mixture of metal dip-coat powder, non-reactive binder, and a solvent. While a portion of the solvent in the dip-coat binder solution 144 may be evaporated during dipping of the green body part 140, a certain amount of solvent may remain within the dip-coat binder solution 144 on the outer surface 152 of the green body part 140. Therefore, in embodiments, the dip-coat binder solution 144 may be thermally cured at a temperature that is suitable for evaporating the solvent remaining in the dip-coat binder solution 144 and allow efficient bonding of the metal dip-coat powder 146 to itself and the green body part 140, thereby forming the metal powder coating 154.

In embodiments, heat is applied to the dip-coated green body part 140 using an IR lamp and/or heated plate (e.g., on-machine), or curing may be carried out by placing the printed part in an oven (e.g., off-machine). In embodiments, the first temperature is greater than or equal to 50° C. and less than or equal to 200° C., greater than or equal to 50° C. and less than or equal to 150° C., greater than or equal to 75° C. and less than or equal to 125° C., or even greater than or equal to 90° C. and less than or equal to 110° C. In embodiments, the dip-coated green body part 140 may be heated to the first temperature at a rate greater than or equal to 50° C./hr and less than or equal to 150° C. per hour. In embodiments, the dip-coated green body part 140 may be held at the first temperature for a period greater than or equal to 0.1 hour and less than or equal to 1 hour.

In embodiments, heating the dip-coated green body part 140 to a first temperature may include heating the dip-coated green body part 140 in an oxygen-free environment (e.g., in a vacuum chamber/inert atmosphere). In embodiments, heating may be performed under nitrogen ($N_2$), argon (Ar), another inert gas, under vacuum, or combinations thereof. In embodiments, the heating may be performed in air or in any other environment suitable for the specific materials being processed.

In embodiments, the thickness of the metal powder coating 154 on the green body part 140 may be adjusted based on the specific application of the final consolidated part. The thickness of the metal powder coating 154 on the green body part 140 should be sufficiently high (e.g., greater than or equal to 0.01 µm) to prevent phase separation or skinning effect between the metal powder coating 154 and the green body part 140. However, the thickness of the metal powder coating 154 should be kept relatively low (less than or equal to 3 mm) so as not to significantly and/or negatively alter the profile of the underlying green body part 140. In embodiments, the thickness of the metal powder coating 154 on the green body part 140 is greater than or equal to 0.01 µm and less than or equal to 3 mm. In embodiments, the thickness of the metal powder coating 154 on the green body part 140 may be greater than or equal to 0.01 µm, greater than or equal to 1 µm, greater than or equal to 100 µm, or even greater than or equal to 500 µm. In embodiments, the thickness of the metal powder coating 154 on the green body part 140 may be less than or equal to 3 mm, less than or equal to 2 mm, or even less than or equal to 1 mm. For example, the thickness of the metal powder coating 154 on the green body part 140 may be greater than or equal to 0.01 µm and less than or equal to 3 mm, greater than or equal to 0.01 µm and less than or equal to 2 mm, greater than or equal to 0.01 µm and less than or equal to 1 mm, greater than or equal to 1 µm and less than or equal to 3 mm, greater than or equal to 1 µm and less than or equal to 2 mm, greater than or equal to 1 µm and less than or equal to 1 mm, greater than or equal to 100 µm and less than or equal to 3 mm, greater than or equal to 100 µm and less than or equal to 2 mm, greater than or equal to 100 µm and less than or equal to 1 mm, greater than or equal to 500 µm and less than or equal to 3 mm, greater than or equal to 500 µm and less than or equal to 2 mm, or even greater than or equal to 500 µm and less than or equal to 1 mm, or any and all sub-ranges formed from any of these endpoints.

In embodiments, the amount of metal powder coating 154 on the coated green body part 140 is, based on a total weight of the coated green body part 140 (i.e., weight of metal powder coating 154 and weight of green body part 140), greater than or equal to 0.5 wt % and less than or equal to 3 wt %, greater than or equal to 0.5 wt % and less than or equal to 2.5 wt %, greater than or equal to 0.5 wt % and less than or equal to 2 wt %, greater than or equal to 0.75 wt % and less than or equal to 3 wt %, greater than or equal to 0.75 wt % and less than or equal to 2.5 wt %, greater than or equal to 0.75 wt % and less than or equal to 2 wt %, greater than or equal to 1 wt % and less than or equal to 3 wt %, greater than or equal to 1 wt % and less than or equal to 2.5 wt %, or even greater than or equal to 1 wt % and less than or equal to 2 wt %, or any and all sub-ranges formed from any of these endpoints.

In embodiments, the metal powder coating 154 comprises greater than or equal to 25 wt % and less than or equal to 70 wt % of the metal dip-coat powder 146, based on a total weight of the metal powder coating 154. In embodiments, the metal powder coating 154 comprises greater than or equal to 30 wt % and less than or equal to 70 wt % of the metal dip-coat powder 146, based on a total weight of metal powder coating 154. In embodiments, the metal powder coating 154 may comprise greater than or equal to 25 wt %, greater than or equal to 35 wt %, or even greater than or equal to 45 wt % of the metal dip-coat powder 146, based on a total weight of the metal powder coating 154. In embodiments, the metal powder coating 154 may comprise less than or equal to 70 wt %, less than or equal to 60 wt %, or even less than or equal to 50 wt % of the metal dip-coat powder 146, based on a total weight of the metal powder coating 154. For example, the metal powder coating 154 may comprise greater than or equal to 25 wt % and less than or equal to 70 wt %, greater than or equal to 25 wt % and less than or equal to 60 wt %, greater than or equal to 25 wt % and less than or equal to 50 wt %, greater than or equal to 35 wt % and less than or equal to 70 wt %, greater than or equal to 35 wt % and less than or equal to 60 wt %, greater than or equal to 35 wt % and less than or equal to 50 wt %, greater than or equal to 45 wt % and less than or equal to 70 wt %, greater than or equal to 45 wt % and less than or equal to 60 wt %, or even greater than or equal to 45 wt % and less than or equal to 50 wt %, or any and all sub-ranges formed from any of these endpoints of metal dip-coat powder 146, based on a total weight of the metal powder coating 154.

In embodiments, the metal powder coating 154 comprises greater than or equal to 30 wt % and less than or equal to 75 wt % of the dip-coat binder 148, based on a total weight of the metal powder coating 154. In embodiments, the metal powder coating 154 may comprise greater than 30 wt %, greater than or equal to 40 wt %, greater than or equal to 50 wt %, or even greater than or equal to 55 wt % of the dip-coat binder 148, based on a total weight of the metal powder coating 154. In embodiments, the metal powder coating 154 may comprise less than or equal to 75 wt % or even less than or equal to 65 wt % of the dip-coat binder 148, based on a total weight of the metal powder coating 154. For example, the metal powder coating 154 may comprise greater than or equal to 30 wt % and less than or equal to 75 wt %, greater than or equal to 30 wt % and less than or equal to 65 wt %, greater than or equal to 40 wt % and less than or equal to 75 wt %, greater than or equal to 40 wt % and less than or equal to 65 wt %, greater than or equal to 50 wt % and less than or equal to 75 wt %, greater than or equal to 50 wt % and less than or equal to 65 wt %, greater than or equal to 55 wt % and less than or equal to 75 wt %, or even greater than or equal to 55 wt % and less than or equal to 65 wt %, or any and all sub-ranges formed from any of these endpoints of the dip-coat binder 148, based on a total weight of the metal powder coating 154.

In embodiments, the metal powder coating 154 on the green body part 140 part has a surface roughness Ra less than or equal to 10 μm. In embodiments, the metal powder coating 154 on the green body part 140 may have a surface roughness Ra greater than or equal to 1 μm, greater than or equal to 2 μm, or even greater than or equal to 3 μm. In embodiments, the metal powder coating 154 on the green body part 140 may have a surface roughness Ra less than or equal to 10 μm, less than or equal to 8 μm, less than or equal to 7 μm, less than or equal to 6 μm, or even less than or equal to 4 μm. In embodiments, the metal powder coating 154 on the green body part 140 may have a surface roughness Ra greater than or equal to 1 μm and less than or equal to 10 μm, greater than or equal to 1 μm and less than or equal to 8 μm, greater than or equal to 1 μm and less than or equal to 7 μm, greater than or equal to 1 μm and less than or equal to 6 μm, greater than or equal 1 μm and less than or equal to 4 μm, greater than or equal to 2 μm and less than or equal to 10 μm, greater than or equal to 2 μm and less than or equal to 8 μm, greater than or equal to 2 μm and less than or equal to 7 μm, greater than or equal to 2 μm and less than or equal to 6 μm, greater than or equal 2 μm and less than or equal to 4 μm, greater than or equal to 3 μm and less than or equal to 10 μm, greater than or equal to 3 μm and less than or equal to 8 μm, greater than or equal to 3 μm and less than or equal to 7 μm, greater than or equal to 3 μm and less than or equal to 6 μm, or even greater than or equal 3 μm and less than or equal to 4 μm, or any and all sub-ranges formed from any of these endpoints.

In embodiments, the green body part 140 having a metal powder coating 154 may have a surface roughness Ra reduction greater than or equal to 20%, greater than or equal to 30%, greater than or equal to 40%, or even greater than 50% as compared to a surface roughness Ra of a green body part 140 without a metal powder coating 154.

In embodiments, the difference between the surface roughness Ra of a green body part 140 without a metal powder coating 154 and the surface roughness Ra of the green body part 140 having a metal powder coating 154 may be greater than or equal to 1 μm, greater than or equal to 3 μm, greater than or equal to 5 μm, greater than or equal to 7 μm, greater than or equal to 9 μm, greater than or equal to 11 μm, greater than or equal to 13 μm, or even greater than or equal to 15 μm.

Figure 8:
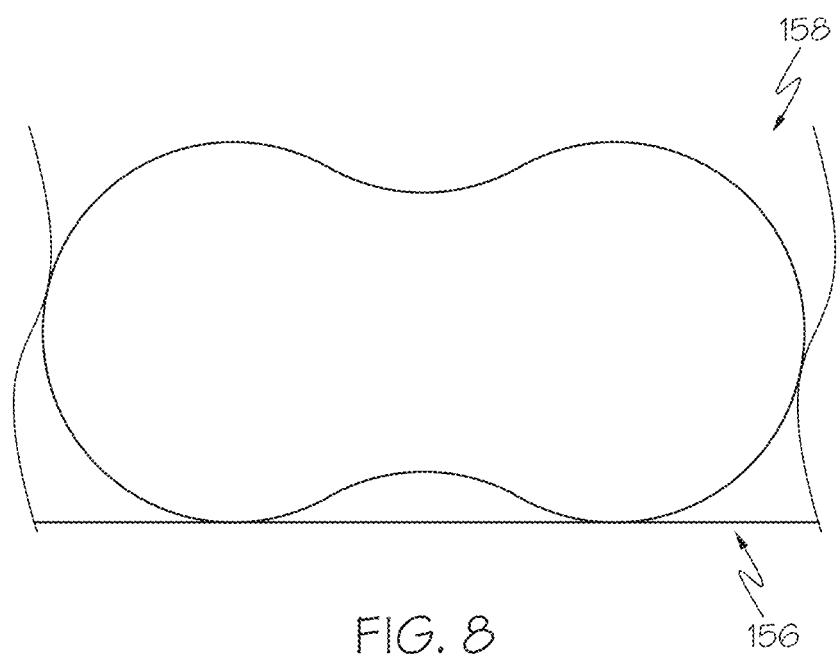
FIG. 8 is a schematic view of a consolidated part having a metallic outer surface according to one or more embodiments shown and described herein.

Following the formation of the metal powder coating 154, the method 100 of FIG. 1 concludes at block 108 with heating the dip-coated green body part 140 to a second temperature to remove the print binder and dip-coat binder 148 (i.e., debinding) and sinter the metal dip-coat powder 146 and print powder 114 (i.e., sintering) (FIG. 4), thereby forming a consolidated part. As shown in FIG. 8, during the debinding and sintering step, the metal dip-coat powder 146 sinter to themselves and the print powder 114 (FIG. 4) sinters to itself, thereby forming a consolidated part 156 with a metallic outer surface 158.

In embodiments, the second temperature is greater than or equal to 200° C. and less than or equal to 1400° C., greater than or equal to 200° C. and less than or equal to 1200° C., greater than or equal to 200° C. and less than or equal to 1000° C., greater than or equal to 400° C. and less than or equal to 1400° C., greater than or equal to 400° C. and less than or equal to 1200° C., greater than or equal to 400° C. and less than or equal to 1000° C., greater than or equal to 600° C. and less than or equal to 1400° C., greater than or equal to 600° C. and less than or equal to 1200° C., greater than or equal to 600° C. and less than or equal to 1000° C., greater than or equal to 800° C. and less than or equal to 1400° C., greater than or equal to 800° C. and less than or equal to 1200° C., or even greater than or equal to 800° C. and less than or equal to 1000° C., or any and all sub-ranges formed from any of these endpoints. In embodiments, the dip-coated green body part 140 may be heated to the second temperature at a rate than or equal to 50° C./hr and less than or equal to 150° C. per hour. In embodiments, the dip-coated green body part 140 may be held at the second temperature for a period greater than or equal to 0.5 hour and less than or equal to 8 hours.

In embodiments, heating the dip-coated green body part to a second temperature may include heating the dip-coated green body part in an oxygen-free environment (e.g., in a vacuum chamber under inert atmosphere). In embodiments, heating may be performed under nitrogen ($N_2$), argon (Ar), another inert gas, under vacuum, or combinations thereof. In embodiments, the heating may be performed in air or in any other environment suitable for the specific materials being processed.

In embodiments, the heating of blocks 106 and 108 of method 100 illustrated in FIG. 1 occur in a single step.

In embodiments, the metallic outer surface 158 of the consolidated part 156 has a surface roughness Ra less than or equal to 8 μm. In embodiments, the metallic outer surface 158 on the consolidated part 156 may have a surface roughness Ra greater than or equal to 1 μm, greater than or equal to 2 μm, or even greater than or equal to 3 μm. In embodiments, the metallic outer surface 158 on the consolidated part 156 may have a surface roughness Ra less than or equal to 8 μm, less than or equal to 6 μm, or even less than or equal to 4 μm. In embodiments, the metallic outer surface 158 on the consolidated part 156 may have a surface roughness Ra greater than or equal to 1 μm and less than or equal to 8 μm, greater than or equal to 1 μm and less than or equal to 6 μm, greater than or equal 1 μm and less than or equal to 4 μm, greater than or equal to 2 μm and less than or equal to 8 μm, greater than or equal to 2 μm and less than or equal to 6 μm, greater than or equal 2 μm and less than or equal to 4 μm, greater than or equal to 3 μm and less than or equal to 8 μm, greater than or equal to 3 μm and less than or equal to 6 μm, or even greater than or equal 3 μm and less than or equal to 4 μm, or any and all sub-ranges formed from any of these endpoints.

In embodiments, a consolidated part 156 having a metallic outer surface 158 may have a surface roughness Ra reduction of greater than or equal to 40%, greater than or equal to 50%, or even greater than or equal to 60% as compared to a consolidated part 156 without a metallic outer surface 158.

Although various embodiments described herein are described with reference to method 100, it should be understood that embodiments of the dip-coat binder solution described herein can be used with a variety of methods that are known and used by those skilled in the art. In particular, forming a green body part, dipping, and heating may be accomplished in a number of different ways, in a number of different steps, and in a number of different locations.

EXAMPLES

Embodiments will be further clarified by the following examples. It should be understood that these examples are not limiting to the embodiments described above.

Reduced Surface Roughness

Example 1

Figure 9:
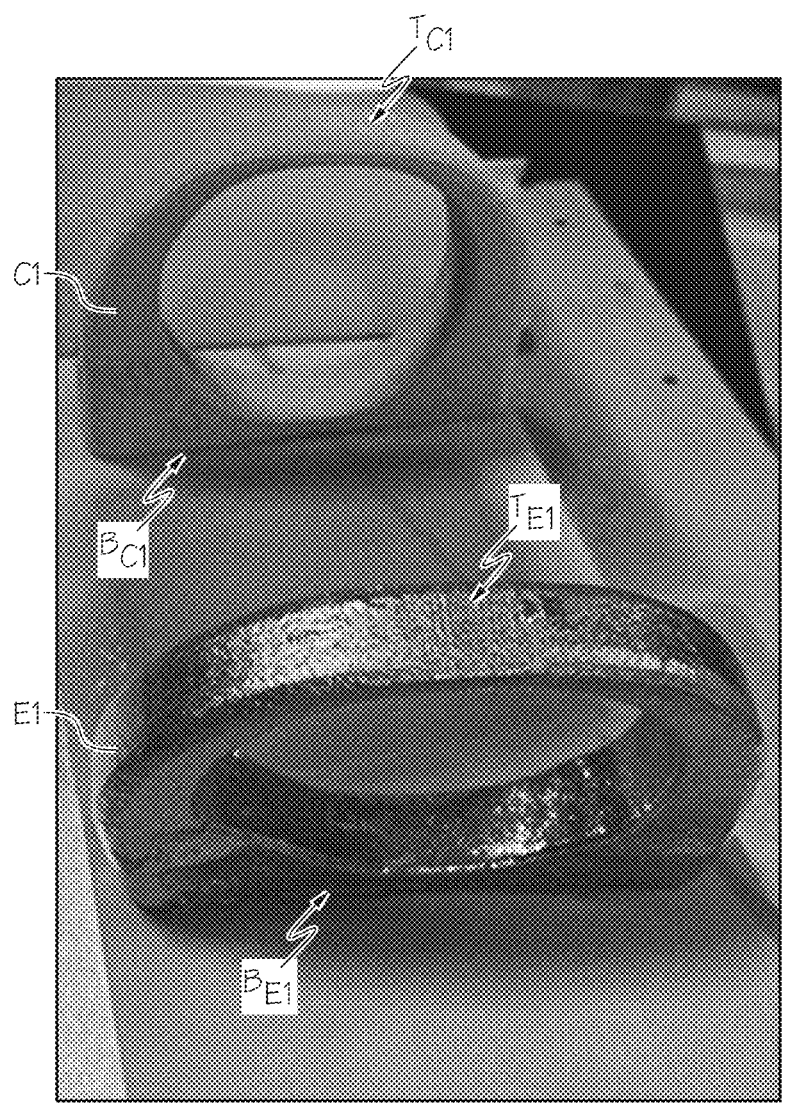
FIG. 9 is a photograph of an un-dipped comparative part and an exemplary part formed using an example dip-coat binder solution comprising metal dip-coat powder according to one or more embodiments described herein.

Two green body parts having a similar configuration printed with Praxair 316L bimodal powder having a particle size distribution D50 of 25 μm are provided as shown in FIG. 9. One of the green body parts, Example Green Part E1, is dipped in a dip-coat binder solution comprising 37.5 g of Sandvik 316L unimodal powder having a particle size distribution D50 of 12 μm and 50 g of allyl cyanoacrylate having a viscosity of 2-6 cP. The other green body part, Comparative Green Example Part C1, is not dipped.

Comparative Green Example Part C1 and Example Green Part E1 are heated at 150° C. for 1 hour, which cures the dip-coat binder solution and forms a metal powder coating on Example Green Part E1. The surface roughness Ra of the top $T_{C1}$ and bottom $B_{C1}$ of the Comparative Example Green Part C1 is measured and is shown in Table 1. The surface roughness Ra of the metal powder coating on the top $T_{E1}$ and bottom $B_{E1}$ of the Example Green Part E1 is measured and is also shown in Table 1.

The Comparative Example Green Part C1 and the Example Green Part E1 are heated at 150° C. for 1 hour, which results in a Comparative Example Consolidated Part C1 and an Example Consolidated Part E1. Heating at 1390° C. for 6 hour debinds and sinters Example Green Part 1, forming Example Consolidated Part 1 having a metallic outer surface. The surface roughness Ra of the top $T_{C1}$ and bottom $B_{C1}$ of the Comparative Example Consolidated Part C1 is measured and is shown in Table 1. The surface roughness Ra of the metallic outer surface on the top $T_{E1}$ and bottom $B_{E1}$ of the Example Consolidated Part E1 is measured and is also shown in Table 1.

TABLE 1

| Example Part | Green body part Ra (μm) | % Difference | Consolidated part Ra (μm) | % Difference |
|---|---|---|---|---|
| C1 (top) | 8 | — | 6.1 | — |
| C1 (bottom) | 13 | — | 12.7 | — |
| E1 (top) | 4.2 | 47.5 | 2.46 | 59.7 |
| E1 (bottom) | 3.7 | 71.5 | 2.28 | 82.5 |

As shown in Table 1, the Example Green Part E1 has a reduction of surface roughness Ra on the top and bottom of the green body part of 47.5% and 71.5%, respectively, as compared to the Comparative Example Green Part C1. Furthermore, the Example Consolidated Part E1 has a reduction of surface roughness Ra on the top and bottom of 59.7% and 82.5%, respectively, as compared to the Comparative Example Consolidated Part C1.

As exemplified in Example 1, dipping a green body part in a dip-coat binder solution in accordance with embodiments described herein results in a green body part and corresponding consolidated part having reduced surface roughness Ra as compared to un-dipped green body part and corresponding consolidated part.

Example 2

Figure 10:
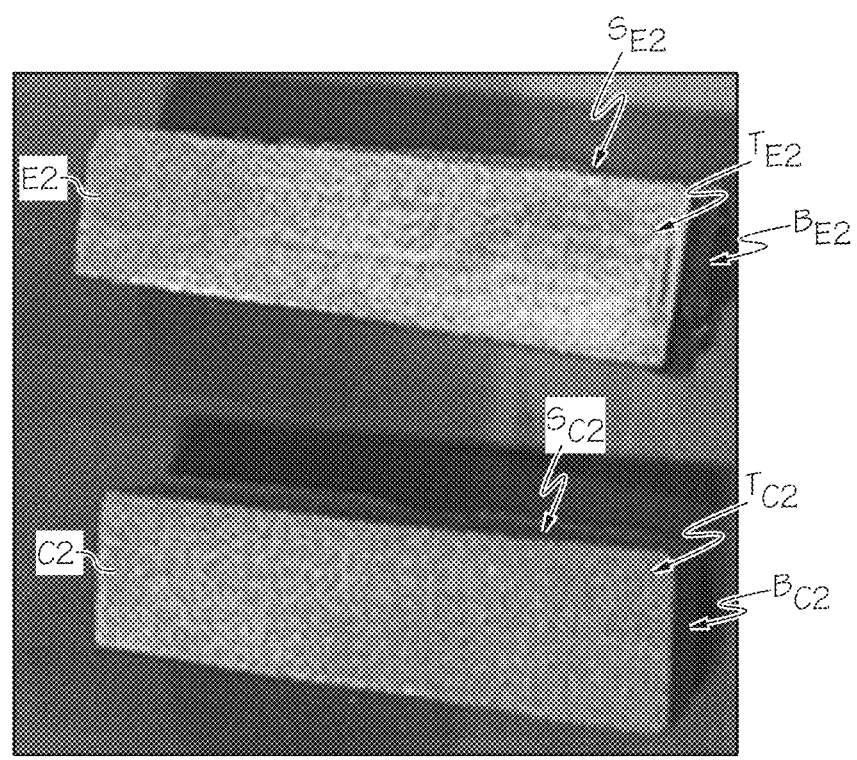
FIG. 10 is a photograph of an un-dipped comparative part and an exemplary part formed using an example dip-coat binder solution comprising metal dip-coat powder according to one or more embodiments described herein.

Two green body parts having a similar configuration printed with Sandvik 316L bimodal powder having a particle size distribution D50 of 25 μm are provided as shown in FIG. 10. One of the green body parts, Example Green Part E2, is dipped in a dip-coat binder solution comprising 25 g of Sandvik 316L unimodal powder having a particle size distribution D50 of 12 μm and 50 g of 10% PVP (Mw=40,000 g/mol) in ethanol having a viscosity of 6.72 cP. The other green body part, Comparative Example Green Part C2, is not dipped.

Comparative Example Green Part C2 and Example Green Part E2 are heated at 150° C. for 1 hour, which cures the dip-coat binder solution and forms a metal powder coating on Example Green Part E2. The surface roughness Ra of the top $T_{C2}$, side $S_{C2}$, and bottom $B_{C2}$ of the Comparative Example Green Part C2 is measured and is shown in Table 2. The surface roughness Ra of the metal powder coating on the top $T_{E2}$, side $S_{E2}$, and bottom $B_{E2}$ of the Example Green Part E2 is measured and is also shown in Table 2.

The Comparative Example Green Part C2 and the Example Green Part E2 are heated at 100° C. for 0.5 hour, which results in a Comparative Example Consolidated Part C2 and an Example Consolidated Part E2. Heating the Example Green Part E2 at 1390° C. for 6 hour debinds and sinters Example Green Part E2, forming Example Consolidated Part E2 having a metallic outer surface. The surface roughness Ra of the top $T_{C2}$, side $S_{C2}$, and bottom $B_{C2}$ of the Comparative Example Consolidated Part C2 is measured and is shown in Table 2. The surface roughness Ra of the metallic outer surface on the top $T_{E2}$, side $S_{E2}$, and bottom $B_{E2}$ of the Example Consolidated Part E2 is measured and is also shown in Table 2.

TABLE 2

| Example Part | Green body part Ra (μm) | % Difference | Consolidated part Ra (μm) | % Difference |
|---|---|---|---|---|
| C2 (top) | 6.15 | — | 5.8 | — |
| C2 (side) | 9.8 | — | 8.8 | — |
| C2 (bottom) | 12 | — | 11 | — |

TABLE 2-continued

| Example Part | Green body part Ra (μm) | % Difference | Consolidated part Ra (μm) | % Difference |
| --- | --- | --- | --- | --- |
| E2 (top) | 2.87 | 53.3 | 2.3 | 60.3 |
| E2 (side) | 3.17 | 67.7 | 2.08 | 76.4 |
| E2 (bottom) | 3.4 | 71.7 | 2.1 | 80.9 |

As shown in Table 2, the Example Green Part E2 has a reduction of surface roughness Ra on the top, side, and bottom of the green body part of 53.3%, 67.6%, and 71.7%, respectively, as compared to the Comparative Example Green Part C2. Furthermore, the Example Consolidated Part 2 has a reduction of surface roughness Ra on the top, side, and bottom of the consolidated part of 60.3%, 76.4%, 80.9%, respectively, as compared to the Comparative Example Consolidated Part C2.

As exemplified in Example 2, dipping a green body part in a dip-coat binder solution in accordance with embodiments described herein results in a green body part and corresponding consolidated part having reduced surface roughness as compared to un-dipped green body part and corresponding consolidated part.

Example 3

Figure 11:
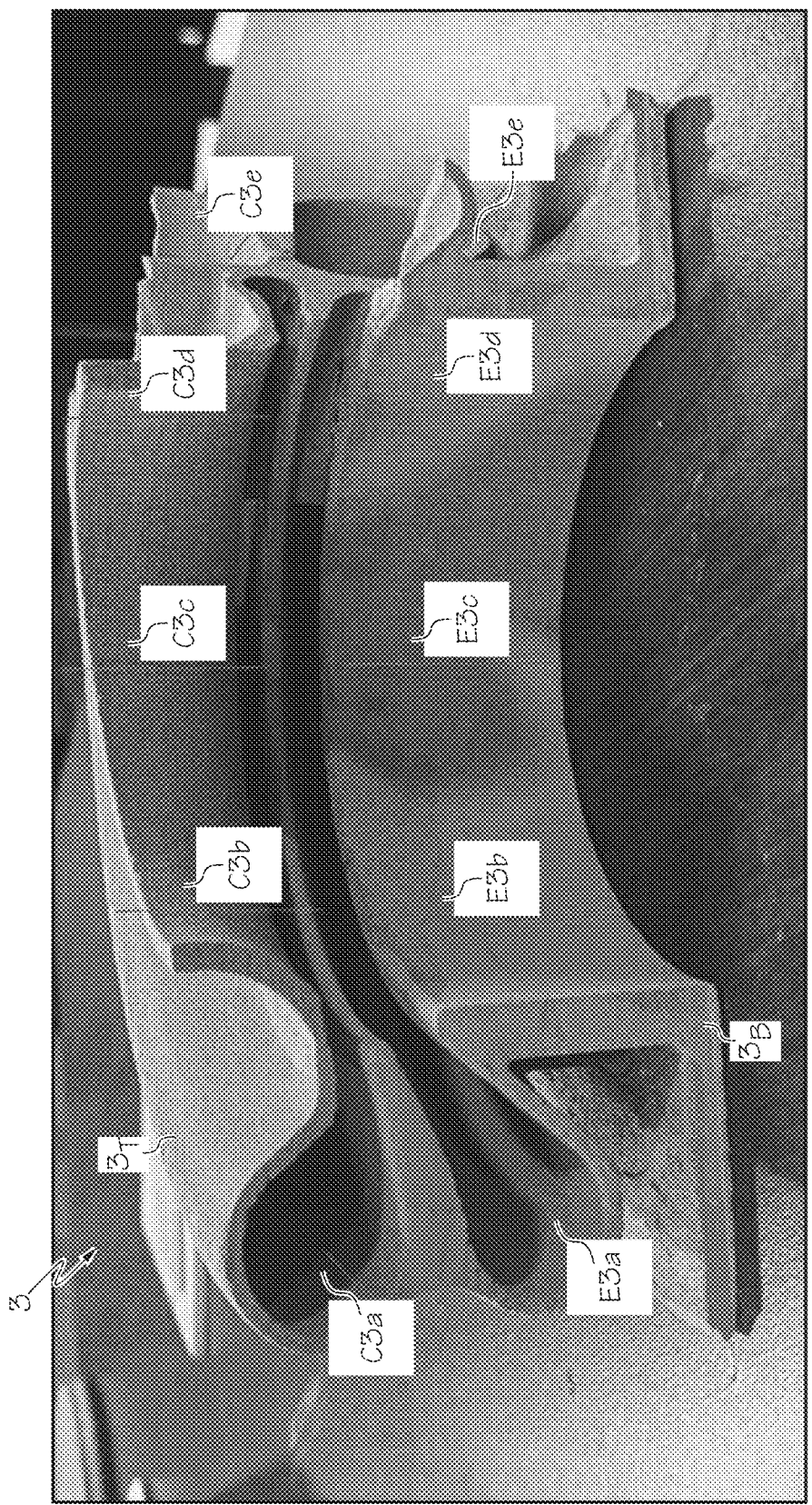
FIG. 11 is a photograph of a part having an un-dipped comparative top portion and an exemplary bottom portion formed using an example dip-coat binder solution metal dip-coat powder according to one or more embodiments described herein.

A green body part 3 printed with Praxair 316L bimodal powder having a particle size distribution D50 of 25 μm is provided as shown in FIG. 11. The green body part has a Comparative Example top portion $3_T$ with points C3a-C3e and an Example bottom portion $3_B$ with points E3a-E3e. The Example bottom portion $3_B$ is dipped in a dip-coat binder solution having a 1:1 weight ratio of 50 g of Sandvik 316L unimodal powder having a particle size distribution D50 of 12 μm and 50 g of 10% PVP (Mw=40,000 g/mol) in ethanol having a viscosity of 6.72 cP.

The green body part 3 is heated at 100° C. for 1 hour, which cures the dip-coat binder solution and forms a metal powder coating on the Example bottom portion $3_B$ of the green body part 3. The surface roughness Ra at points C3a-C3e of the Comparative Example top portion $3_T$ of the green body part 3 is measured and is shown in Table 3. The surface roughness Ra of the metal powder coating at points E3a-E3e of the Example bottom portion $3_B$ of the green body part 3 is measured and is also shown in Table 3.

TABLE 3

| Example Part Points | Green body part Ra (μm) | % Difference |
| --- | --- | --- |
| C3a | 17.6 | — |
| C3b | 18.2 | — |
| C3c | 17.2 | — |
| C3d | 15.8 | — |
| C3e | 20.7 | — |
| E3a | 13.6 | 22.7 |
| E3b | 4.9 | 73.1 |
| E3c | 5.0 | 70.9 |
| E3d | 4.3 | 72.8 |
| E3e | 8.4 | 59.4 |

As shown in Table 3, the points of the Example bottom portion $3_B$ of the green body part 3 have a reduction of surface roughness Ra of 22.7%, 73.1%, 70.9%, 72.8%, and 59.4%, respectively as compared to the corresponding points of the Comparative Example top portion $3_T$ of the green body part 3.

As exemplified in Example 3, dipping a portion of a green body part in a dip-coat binder solution in accordance with embodiments described herein results in the dipped portion of the green body part having a reduced surface roughness as compared to an un-dipped portion of the green body part.

Example 4

Figure 12:
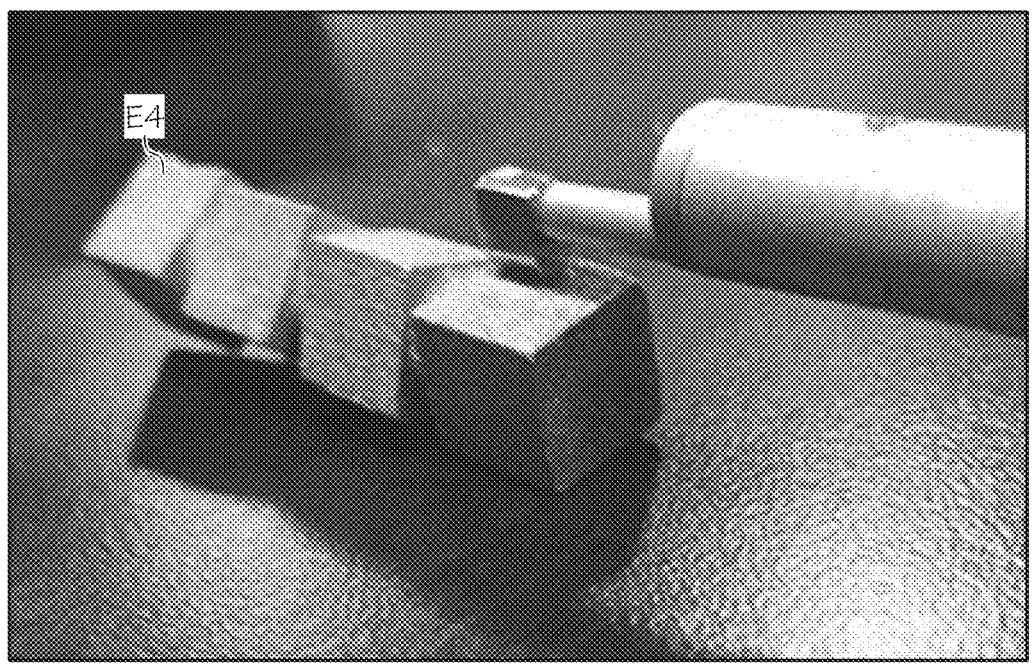
FIG. 12 is a photograph of an exemplary part formed using an example dip-coat binder solution comprising metal dip-coat powder according to one or more embodiments described herein.
Figure 13:
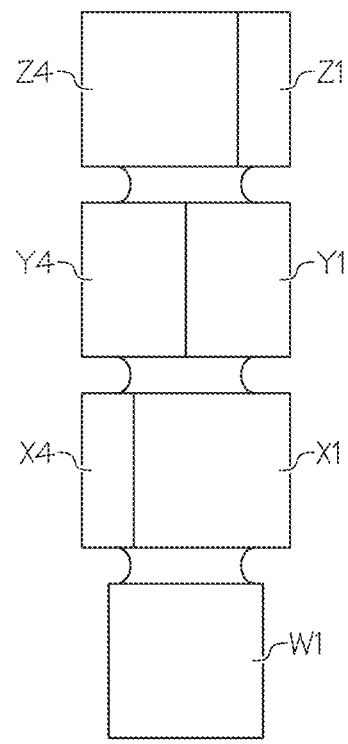
FIG. 13 is schematic side view of the part of FIG. 12.
Figure 14:
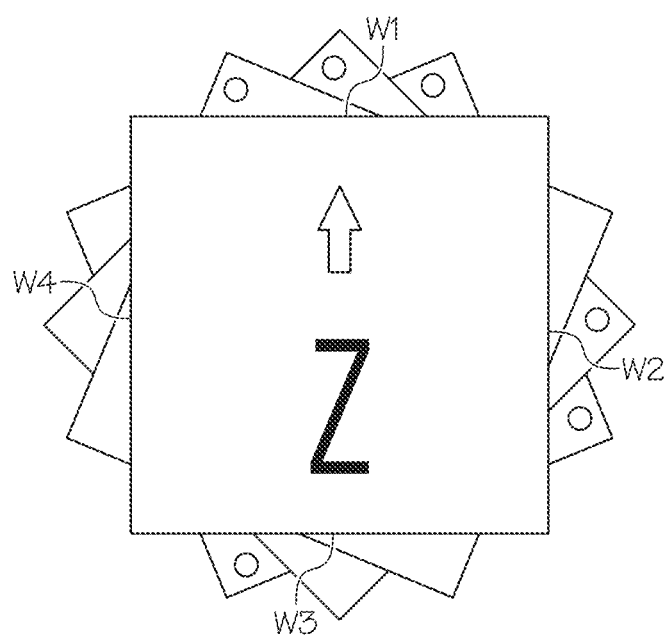
FIG. 14 is a schematic side view of the part of FIG. 13.

Example Green Part E4, a green body part printed with Praxair 316L powder having a particle size distribution D50 of 25 μm, is provided as shown in FIG. 12. The surface roughness Ra of the Example Green Part E4 is measured at different angles W1-4, X1-4, Y1-4, and Z1-4 along Example Green Part E4 as shown in FIGS. 13 and 14 and is shown in Table 4.

Example Green Part E4 is dipped in a dip-coat binder solution having 50 g of Sandvik 316L unimodal powder having a particle size distribution D50 of 12 μm and 50 g of 10% PVP (Mw=40,000 g/mol) in ethanol having a viscosity of 6.72 cP. The dip-coated green body part is heated at 100° C. for 1 hour, which cures the dip-coat binder solution and forms a metal powder coating on Example Green Part 4. The surface roughness Ra of the metal powder coating is measured at different angles along Example Green Part E4 as shown in FIGS. 13 and 14 and is shown in Table 4.

TABLE 4

| Example Part 4 Location | Green body part Ra (μm) | Metal powder coating Ra (μm) | % Difference |
| --- | --- | --- | --- |
| W1 (0°) | 8.2 | 3.0 | 63.4 |
| W2 (90°) | 5.6 | 3.6 | 35.7 |
| W3 (180°) | 13.1 | 5.8 | 55.7 |
| W4 (270°) | 6.0 | 2.9 | 51.7 |
| XI (22.5°) | 8.6 | 4.3 | 50.0 |
| X2 (112.5°) | 8.2 | 3.8 | 53.7 |
| X3 (202.5°) | 12.8 | 2.3 | 82.0 |
| X4 (292.5°) | 9.5 | 4.6 | 51.6 |
| Y1 (45°) | 10 | 6.6 | 34.0 |
| Y2 (135°) | 13 | 5.8 | 55.4 |
| Y3 (225°) | 9.5 | 5.2 | 45.3 |
| Y4 (315°) | 8.3 | 3.8 | 54.2 |
| Z1 (67.5°) | 8.4 | 4.1 | 51.2 |
| Z2 (157.5°) | 9.1 | 4.8 | 47.3 |
| Z3 (247.5°) | 8.8 | 3.4 | 61.4 |
| Z4 (337.5°) | 11.3 | 4.8 | 57.5 |

Figure 15:
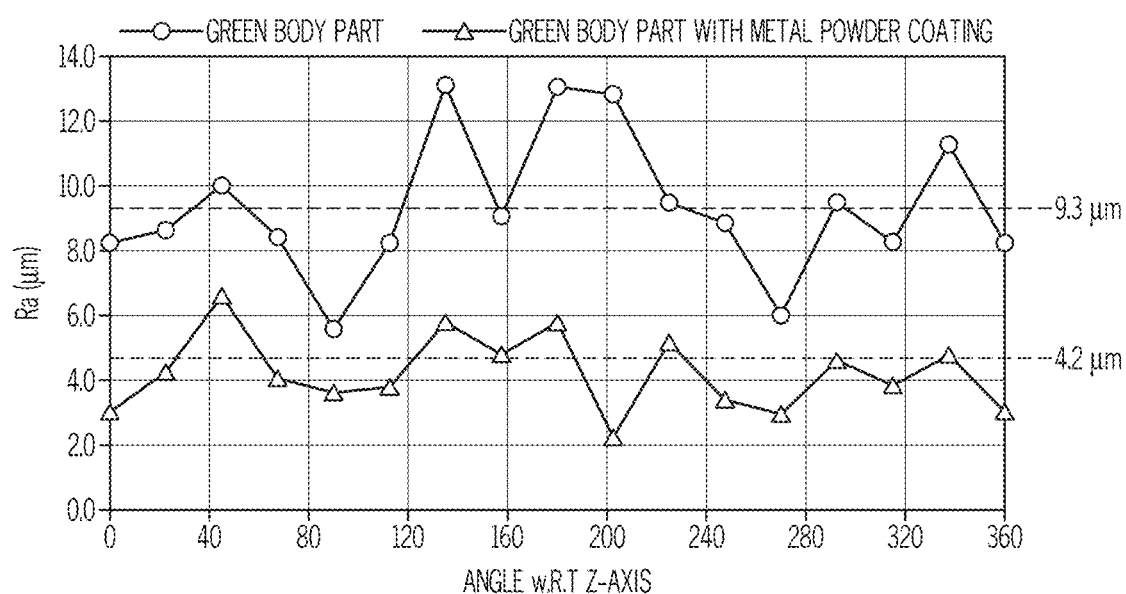
FIG. 15 is a plot of surface roughness (Y-axis; in μm) as a function of the angle with respect to the z-axis (X-axis; in degrees) of the part of FIG. 12.
Figure 16:
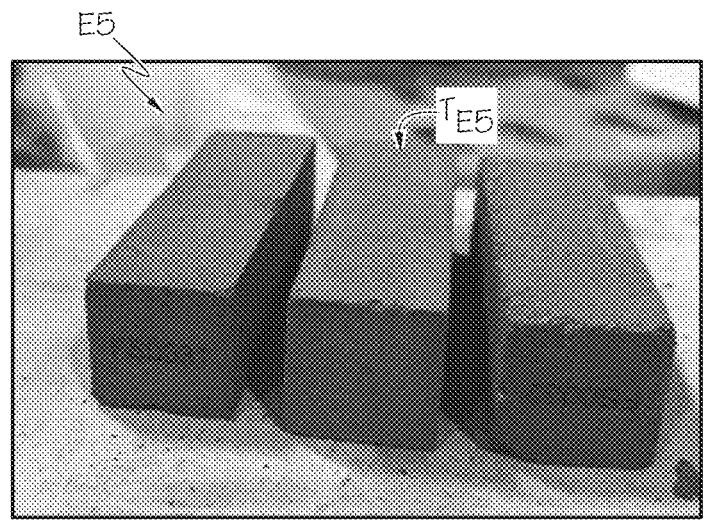
FIG. 16 is a photograph of exemplary parts formed using an example dip-coat binder solution comprising metal dip-coat powder according to one or more embodiments described herein.
Figure 17:
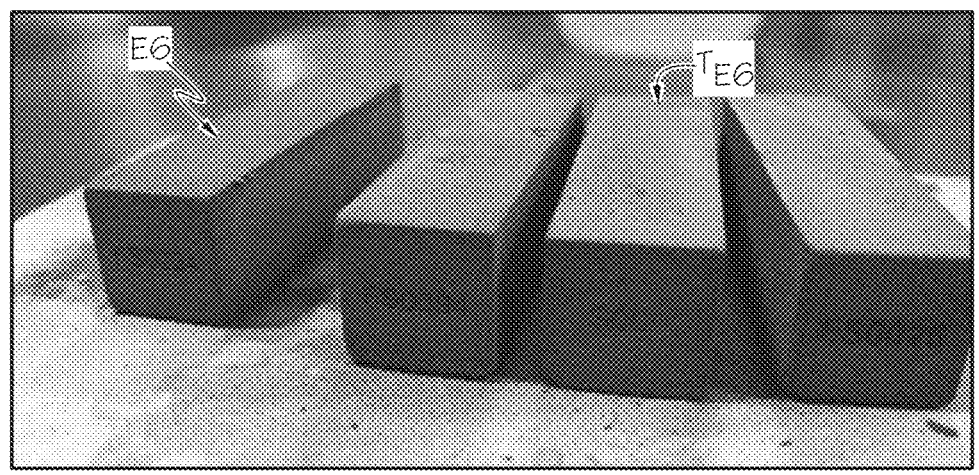
FIG. 17 is a photograph of exemplary parts formed using an example dip-coat binder solution comprising metal dip-coat powder according to one or more embodiments described.
Figure 18:
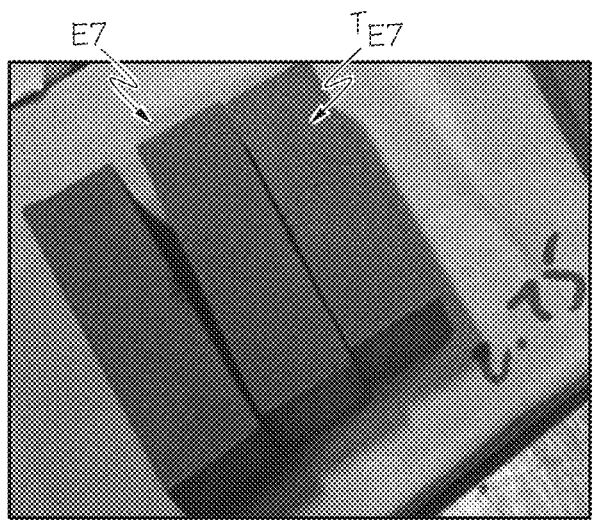
FIG. 18 is a photograph of exemplary parts formed using an example dip-coat binder solution comprising metal dip-coat powder according to one or more embodiments described herein.
Figure 19:
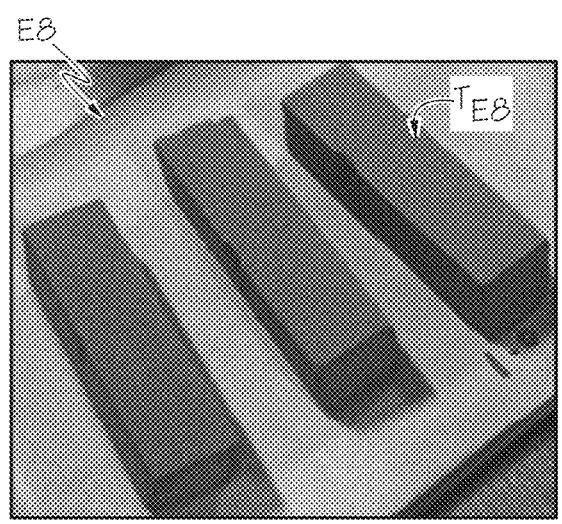
FIG. 19 is a photograph of exemplary parts formed using an example dip-coat binder solution comprising metal dip-coat powder according to one or more embodiments described herein.

As shown in Table 4, Example Green Part E4 with the metal powder coating has a reduction of surface roughness Ra at all angles measured along its surface as compared to Example Green Part E4 with no metal powder coating. Referring now to FIG. 15, Example Green Part E4 has an average surface roughness Ra of 9.3 μm. Example Green Part E4 with the metal powder coating has an average surface roughness Ra of 4.2 μm.

As exemplified in Example 4, dipping a green body part in a dip-coat binder in accordance with embodiments described herein results in a green body part having reduced surface roughness at all surface angles as compared to an un-dipped green body part.

Metal Dip-Coat Powder/Dip-Coat Binder Ratio

Example 5

Four sets of green body parts, Example Green Parts E5-E8, having a similar configuration and printed with Praxair 316L bimodal powder having a particle size distribution D50 of 25 μm are provided as shown in FIGS. 16-19.

Example Green Parts E5-E8 are dipped in dip-coat binder solutions including the amounts of Sandvik 316L unimodal powder having a particle size distribution D50 of 12 µm and allyl cyanoacrylate having a viscosity of 2-6 cP as shown in Table 5. Example Parts E5-E8 are heated at 150° C. for 1 hour, which cures the dip-coat binder solution and forms a metal powder coating on Example Green Parts E5-E8.

TABLE 5

| Example Parts | Metal dip-coat powder/ dip-coat binder ratio | Metal dip-coat powder | Dip-coat binder |
|---|---|---|---|
| E5 | 1:4 (0.25) | 12.5 g | 50 g |
| E6 | 1:2 (0.5) | 25 g | 50 g |
| E7 | 3:4 (0.75) | 37.5 g | 50 g |
| E8 | 1:1 (1) | 50 g | 50 g |

Figure 20:
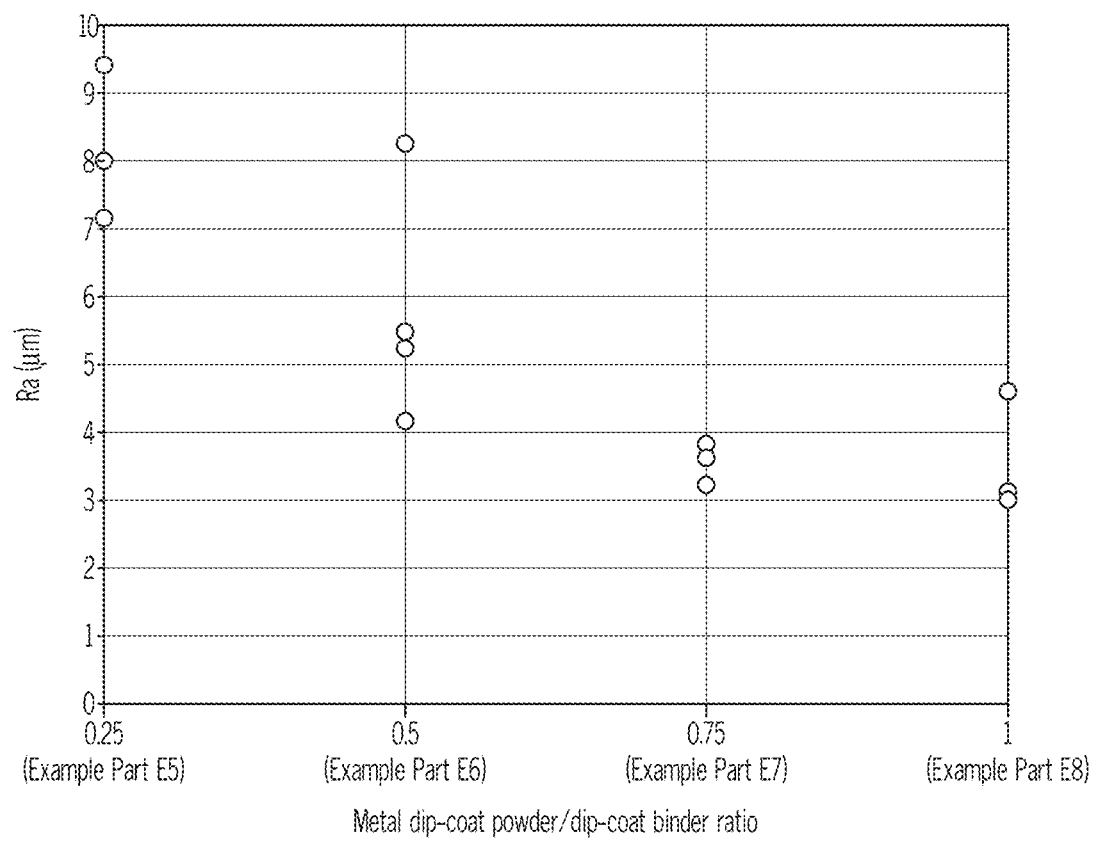
FIG. 20 is a plot of surface roughness (Y-axis; in μm) as a function of surface metallic particle/dip-coat binder ratio (X-axis) of the parts shown in FIGS. 16-19.

Referring now to FIG. 20, the surface roughness Ra of the metal powder coating on the top surface $T_{E5}$, $T_{E6}$, $T_{E7}$, $T_{E8}$ of Example Green Parts E5-E8 is measured. While all Example Green Parts E5-E8 had a surface roughness of less than 10 µm, Example Parts E7 and E8 dipped in dip-coat binder solutions having 3:4 and 1:1 metal dip-coat powder to dip-coat binder ratios, respectively, exhibited the lowest surface roughness.

Example 6

Figure 21:
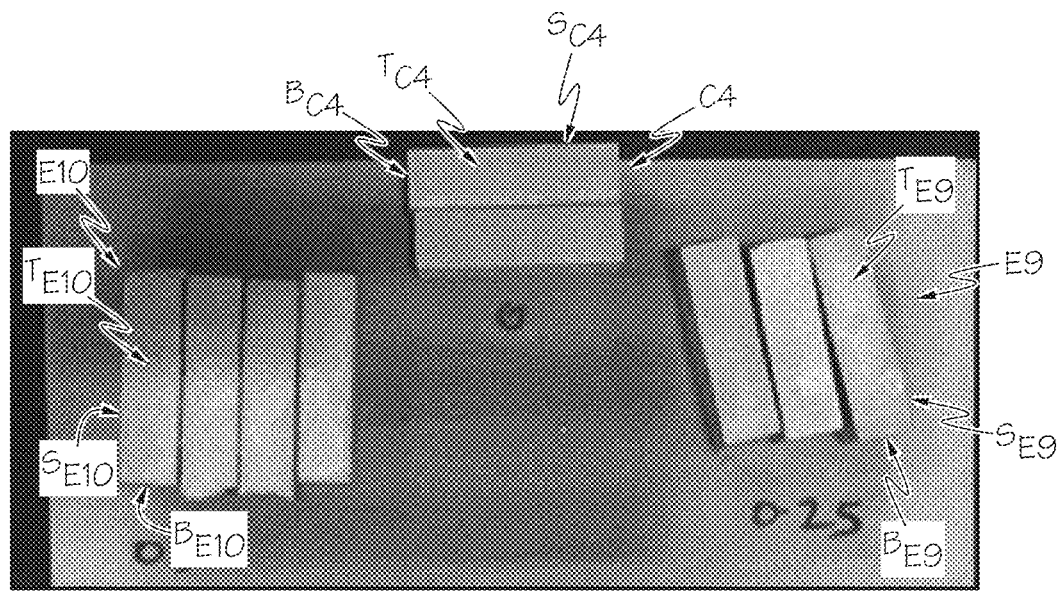
FIG. 21 is a photograph of un-dipped comparative parts and exemplary parts formed using an example dip-coat binder solution comprising metal dip-coat powder according to one or more embodiments described herein.
Figure 22:
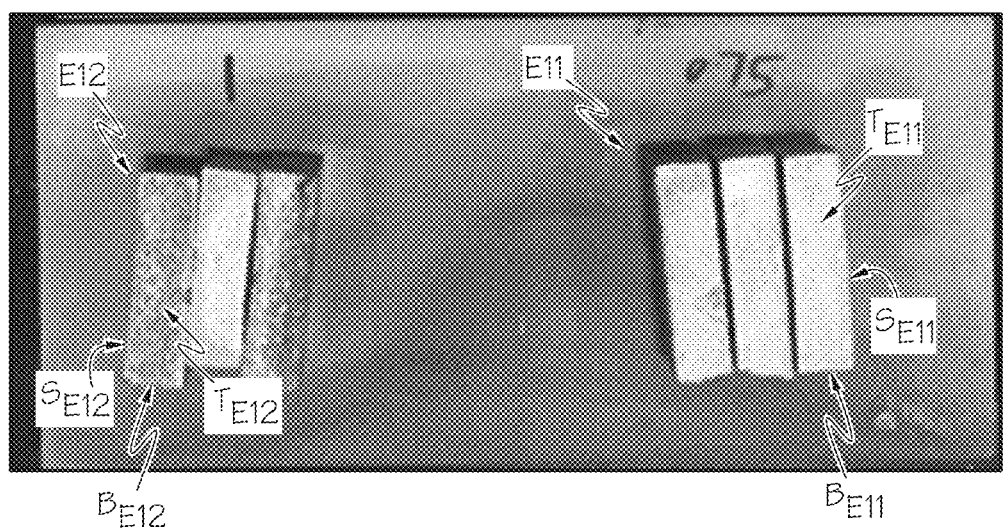
FIG. 22 is a photograph of exemplary parts formed using an example dip-coat binder solution comprising metal dip-coat powder according to one or more embodiments.

Four sets of green body parts, Comparative Example Green Parts C4 and Example Green Parts E9-E12, having a similar configuration and printed with Praxair 316L bimodal print powder having a particle size distribution D50 of 25 µm are provided as shown in FIGS. 21 and 22.

Example Green Parts E9-E12 are dipped in dip-coat binder solutions in the ratios of Sandvik 316L unimodal powder having a particle size distribution D50 of 12 µm and allyl cyanoacrylate having a viscosity of 2-6 cP shown in Table 6. Example Green Parts E9-E12 are heated at 150° C. for 1 hour, which cures the dip-coat binder solution and forms a metal powder coating on Example Green Parts E9-E12.

TABLE 6

| Example Parts | Metal dip-coat powder/ dip-coat binder ratio | Metal dip-coat powder | Dip-coat binder |
|---|---|---|---|
| C4 | — | — | — |
| E9 | 1:4 (0.25) | 2 g | 8 g |
| E10 | 1:2 (0.5) | 4 g | 8 g |
| E11 | 3:4 (0.75) | 6 g | 8 g |
| E12 | 1:1 (1) | 8 g | 8 g |

Figure 23:
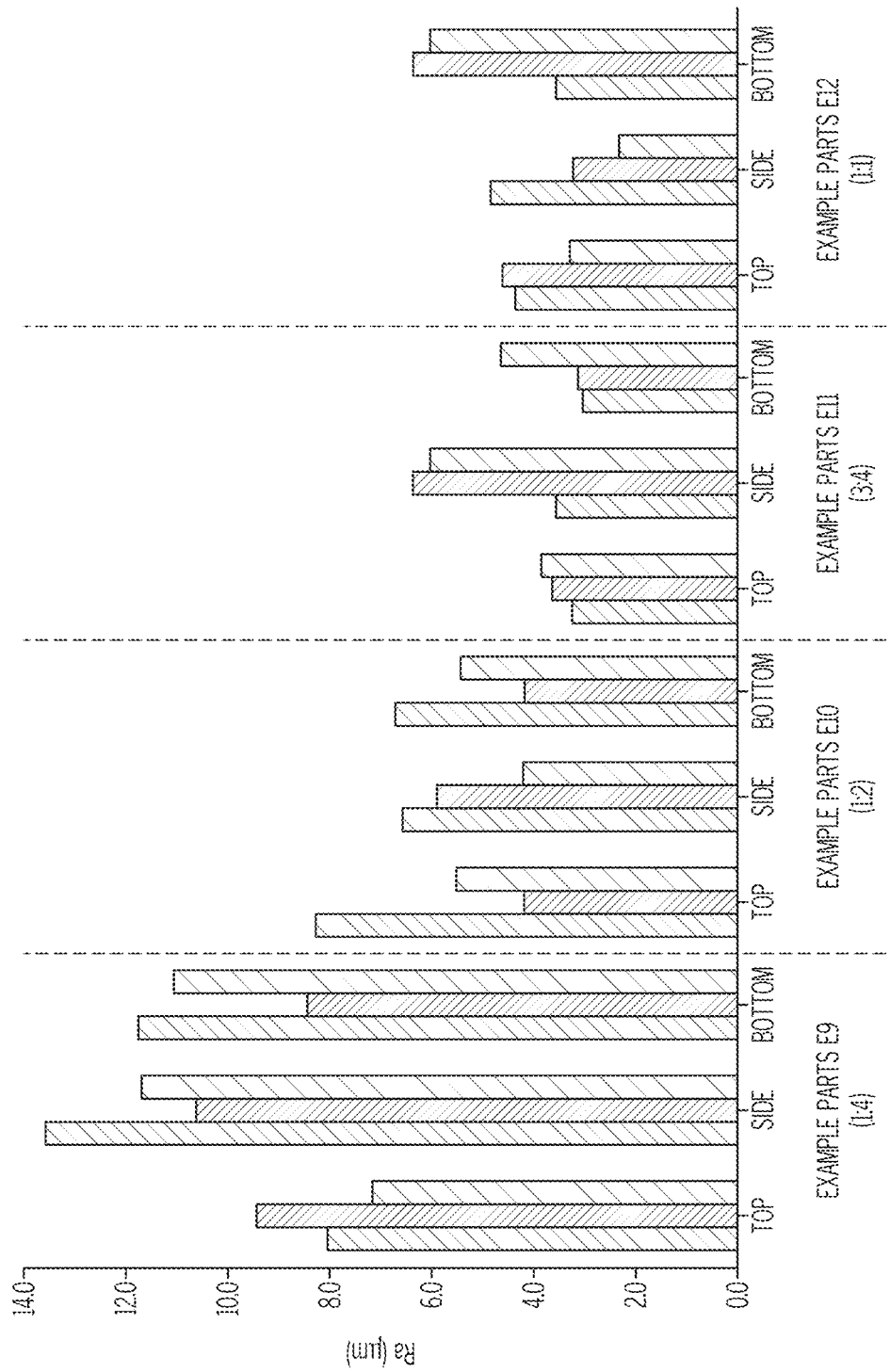
FIG. 23 is a plot of surface roughness (Y-axis; in μm) as a function of surface metallic particle/dip-coat binder ratio (X-axis) of the parts shown in FIGS. 21 and 22.

Referring now to FIG. 23, the surface roughness Ra of the metal powder coating on the top $T_{E9}$, $T_{E10}$, $T_{E11}$, $T_{12}$; side $S_{E9}$, $S_{E10}$, $S_{E11}$, $S_{E12}$; and bottom $B_{E9}$, $B_{E10}$, $B_{E11}$, $B_{E12}$ of the Example Green Parts E9-E12 is measured. Example Green Parts E11 and E12 having 3:4 and 1:1 metal dip-coat powder to dip-coat binder ratios, respectively, exhibited the lowest surface roughness.

Comparative Example Green Parts C4 and Example Green Parts E9-E12 are heated to 150° C. for 1 hour, which results in a Comparative Example Consolidated Parts C4 and Example Parts Consolidated E9-E12. Heating the Example Green Parts E9-E12 to 1390° C. for 6 hour debinds and sinters Example Green Parts E9-E12, forming Example Consolidated Parts E9-E12 having a metallic outer surface.

Figure 24:
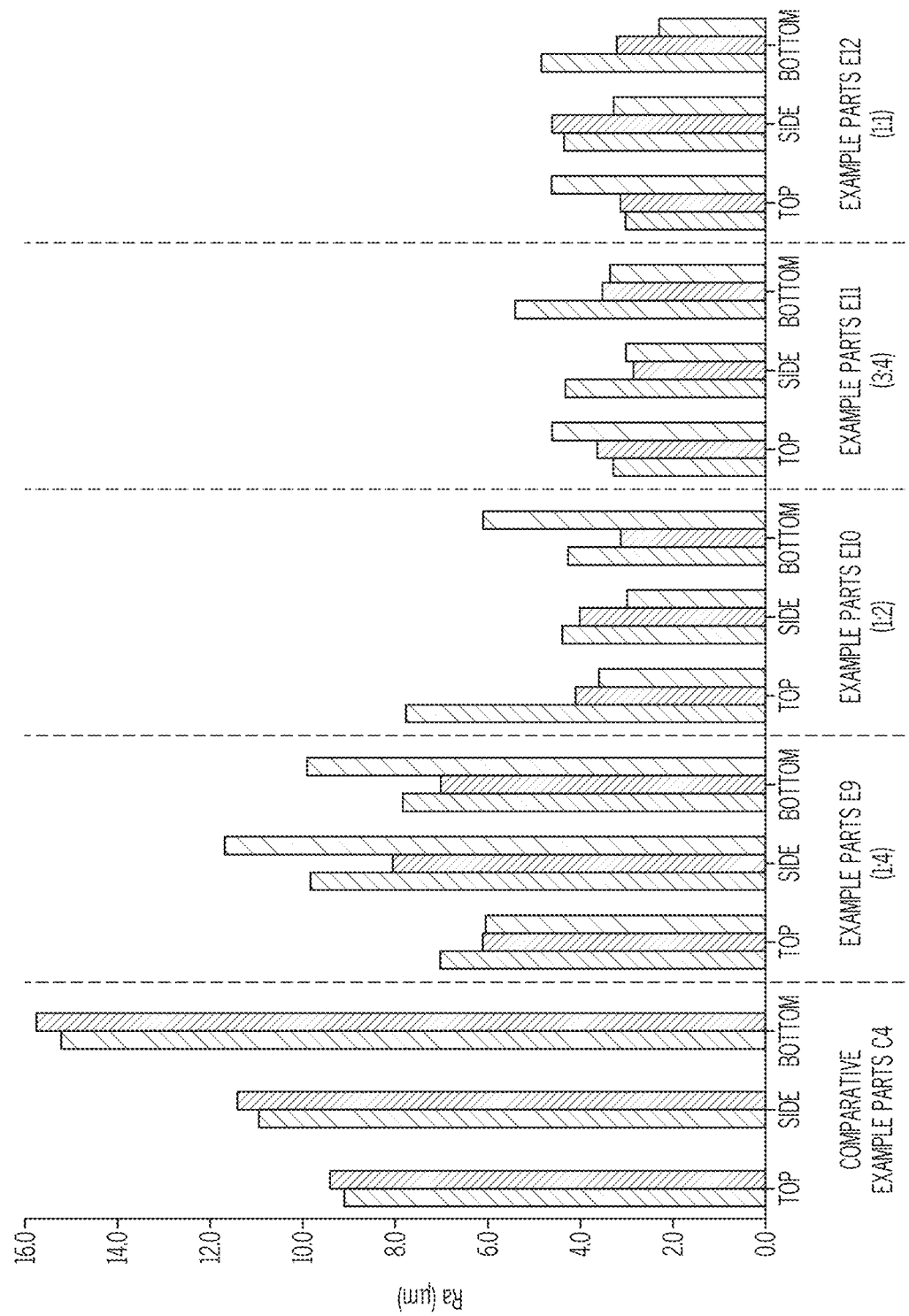
FIG. 24 is a plot of surface roughness (Y-axis; in μm) as a function of surface metallic particle/dip-coat binder ratio (X-axis) of the parts shown in FIGS. 21 and 22.
Figure 25A:
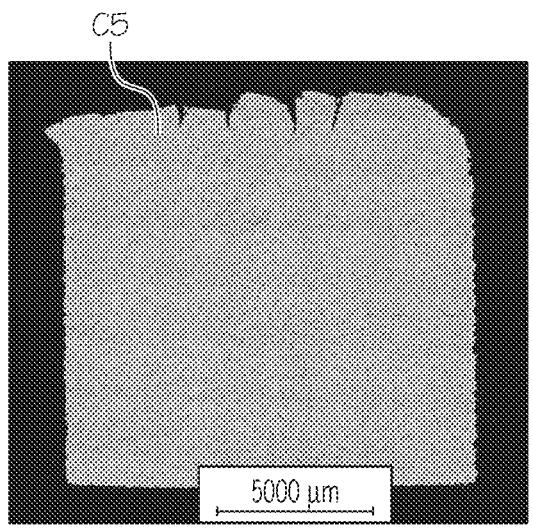
FIGS. 25A-D are micrographs of a comparative part.
Figure 25B:
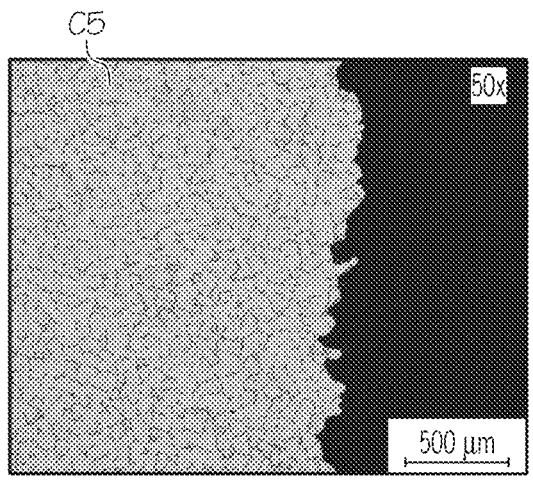
Figure 25C:
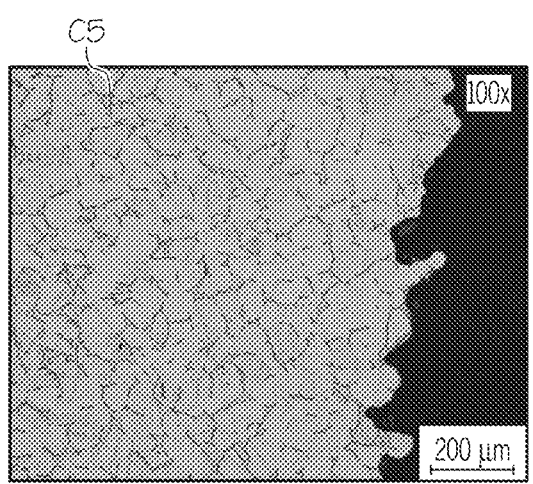
Figure 25D:
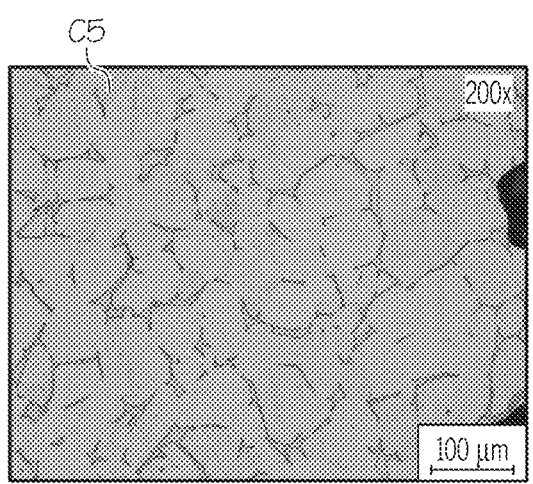
Figure 26A:
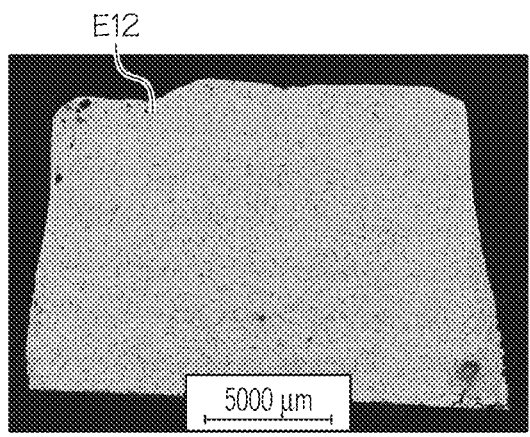
FIGS. 26A-D are micrographs of a part formed using an example dip-coat binder solution comprising metal dip-coat powder according to one or more embodiments.
Figure 26B:
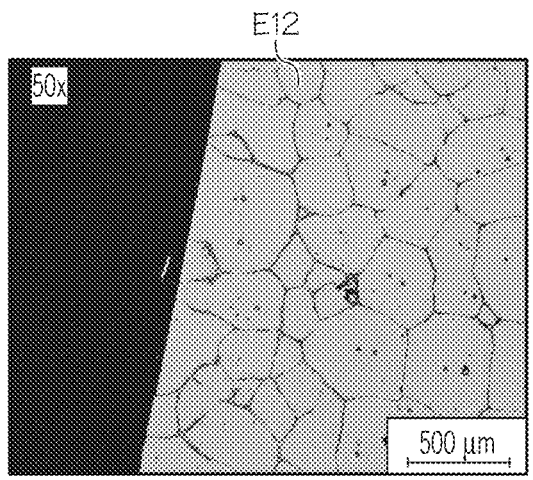
Figure 26C:
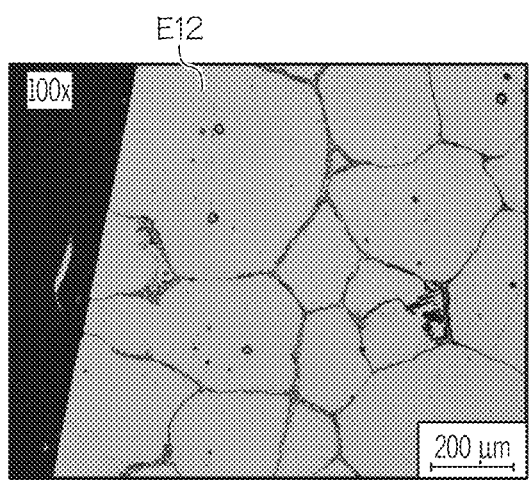
Figure 26D:
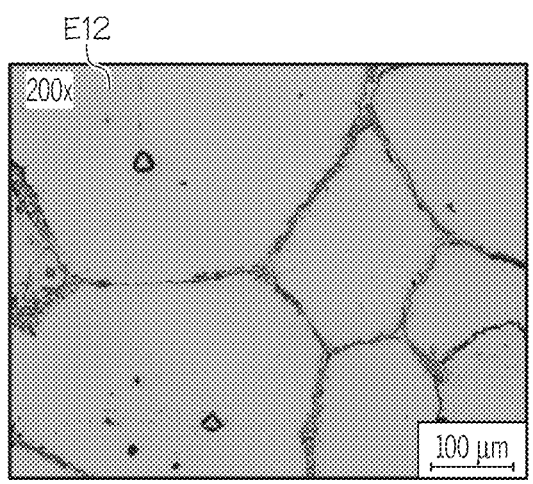

Referring now to FIG. 24, the surface roughness Ra of the top $T_{C4}$, side $S_{C4}$, and bottom $B_{C4}$ of the Comparative Example Consolidated Part C4 is measured. The surface roughness Ra of the metallic outer surface on the top $T_{E9}$, $T_{E10}$, $T_{E11}$, $T_{12}$; side $S_{E9}$, $S_{E10}$, $S_{E11}$, $S_{E12}$; and bottom $B_{E9}$, $B_{E10}$, $B_{E11}$, $B_{E12}$ of the Examples Consolidated Parts E9-E12 is measured and is also shown in FIG. 24. Example Consolidated Parts E11 and E12 having 3:4 and 1:1 metal dip-coat powder to dip-coat binder ratios, respectively, exhibited the lowest surface roughness.

Reduction of Porosity of the Green Body Part

Example 7

Comparative Example Green Part C5 and Example Green Part E12 having a similar configuration and printed with Sandvik 0804 bimodal powder having a particle size distribution D50 of 25 µm are provided as shown in FIGS. 25A-D and 26A-D. Example Green Part E12 is dipped in a dip-coat binder solution having 50 g of Sandvik 316L unimodal powder having a particle size distribution D 50 of 12 µm and 37.5 g of Permabond 919 allyl cyanoacrylate. Example Green Part E12 is dipped in the dip-coat binder solution for 5 seconds and then pulled out of the dip-coat binder solution for 3 seconds to allow excess dip-coat binder solution to drip and drain from Example Green Part E12. Example Green Part E12 is dipped again in the dip-coat binder solution for another 5 seconds and then pulled out. The dip-coated green body part is heated at 120° C. for 1 hour, which cures the dip-coat binder solution and forms a metal powder coating on Example Green Part E12.

As shown in FIG. 26A-D, the double-dipped Example Green Part E12 has smooth edges and a uniform microstructure as compared to Comparative Green Part C5. There is no appreciable carbide decorations/skinning effect between the metal powder coating and the green body part of Example Green Part E12. Comparative Green Part C5 has a surface roughness Ra of approximately 6-11 µm. Double-dipped Example Green Part E12 has a surface roughness Ra of approximately 2-3 µm.

As exemplified by Example 7, the dip-coat binder of the dip-coat binder solution bonds the metal dip-coat powder to itself and the green body part to fill in the rough cavities of the printed green body part and thereby provide a reduced surface roughness. The dip-coat binder bonds the metal dip-coat powder to itself and the green body part without any phase separation or skinning effect.

Further aspects of the invention are provided by the subject matter of the following clauses:

1. A dip-coat binder solution comprising: greater than or equal to 25 wt % and less than or equal to 70 wt % of a metal dip-coat powder, based on a total weight of the dip-coat binder solution, the metal dip-coat powder having a median particle size distribution greater than or equal to 0.5 µm and less than or equal to 30 µm; and a dip-coat binder, wherein the dip-coat binder solution has a viscosity greater than or equal to 1 cP and less than or equal to 40 cP.

2. The dip-coat binder solution of any preceding clause, wherein the dip-coat binder solution comprises greater than or equal to 30 wt % and less than or equal to 70 wt % of the metal dip-coat powder, based on a total weight of the dip-coat binder solution.

3. The dip-coat binder solution of any preceding clause, wherein the metal dip-coat powder has a median particle size distribution greater than or equal to 1 µm and less than or equal to 25 µm.

4. The dip-coat binder solution of any preceding clause, wherein the metal dip-coat powder comprises a stainless steel alloy, a nickel alloy, a copper alloy, a copper-nickel alloy, a cobalt-chrome alloy, a titanium alloy, an aluminum alloy, a tungsten alloy, or a combination thereof.

5. The dip-coat binder solution of any preceding clause, wherein the dip-coat binder solution has a viscosity greater than or equal to 3 cP and less than or equal to 40 cP.

6. The dip-coat binder solution of any preceding clause, wherein the dip-coat binder comprises an adhesive.

7. The dip-coat binder solution of any preceding clause, wherein the adhesive comprises cyanoacrylate, allyl cyano acrylate, n-alkyl cyanoacrylate, or a combination thereof.

8. The dip-coat binder solution of any preceding clause, wherein the dip-coat binder comprises a thermoplastic polymer.

9. The dip-coat binder solution of any preceding clause, wherein the thermoplastic polymer has an average molecular weight greater than or equal to 7,000 g/mol and less than or equal to 50,000 g/mol.

10. The dip-coat binder solution of any preceding clause, wherein the thermoplastic polymer is selected from the group consisting of polystyrene (PS), polyvinyl pyrrolidone (PVP), polyvinyl alcohol (PVA), polycarbonate (PC), polyacrylic acid (PAA), derivatives thereof, and combinations thereof.

11. The dip-coat binder solution of any preceding clause, wherein a weight ratio of the metal dip-coat powder to the dip-coat binder is greater than or equal to 1:4 and less than or equal to 3:1.

12. A coated green body part comprising: a green body part comprising a plurality of layers of print powder; and a metal powder coating on an outer surface of the green body part, the metal powder coating comprising: greater than or equal to 25 wt % and less than or equal to 70 wt % of metal dip-coat powder, based on a total weight of the metal powder coating, the metal powder coating having a mean particle diameter greater than and equal to 0.5 µm to less than or equal to 30 µm; and a dip-coat binder, wherein the metal powder coating has a surface roughness Ra less than or equal to 10 µm 13. The coated green body part of any preceding claim, wherein the metal dip-coat powder comprises a stainless steel alloy, a nickel alloy, a copper alloy, a copper-nickel alloy, a cobalt-chrome alloy, a titanium alloy, an aluminum alloy, a tungsten alloy, or a combination thereof, and the print powder comprises a nickel alloy, a cobalt alloy, a cobalt-chromium alloy, a titanium alloy, an aluminum-based material, tungsten, stainless steel, or a combination thereof.

14. The green body part of any preceding claim, wherein the dip-coat binder comprises cyanoacrylate, ally cyano acrylate, n-alkyl cyanoacrylate, or a combination thereof.

15. The green body part of any preceding claim, wherein the dip-coat binder is selected from the group consisting of polystyrene (PS), polyvinyl pyrrolidone (PVP), polyvinyl alcohol (PVA), polycarbonate (PC), polyacrylic acid (PAA), derivatives thereof, and combinations thereof.

16. A method of forming a part, the method comprising: providing a green body part comprising a plurality of layers of print powder; dipping the green body part in a dip-coat binder solution to form a dip-coated green body part, the dip-coat binder solution having a viscosity greater than or equal to 1 cP and less than or equal to 40 cP and comprising: greater than or equal to 25 wt % and less than or equal to 70 wt % of a metal dip-coat powder, based on a total weight of the dip-coat binder solution, the metal dip-coat powder having a median particle size distribution greater than or equal to 0.5 µm and less than or equal to 30 µm; and a dip-coat binder; and heating the dip-coated green body part, wherein after the dipping, the dip-coated green body part has a surface roughness Ra less than or equal to 10 µm.

17. The method of any preceding claim, wherein heating the dip-coated green body part comprises heating the dip-coated green body part to a first temperature greater than or equal to 50° C. and less than or equal to 200° C. to form a metal powder coating on an outer surface of the green body part.

18. The method of any preceding claim, wherein heating the dip-coated green body part further comprises heating the dip-coated green body part to a second temperature greater than or equal to 200° C. and less than or equal to 1400° C. to sinter the metal dip-coat powder and print powder thereby forming a consolidated part with a metallic outer surface.

19. The method of any preceding claim, wherein the consolidated part has a surface roughness Ra less than or equal to 8 µm.

20. The method of any preceding claim, wherein the metal dip-coat powder comprises a stainless steel alloy, a nickel alloy, a copper alloy, a copper-nickel alloy, a cobalt-chrome alloy, a titanium alloy, an aluminum alloy, a tungsten alloy, or a combination thereof.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A dip-coat binder solution comprising:
greater than or equal to 25 wt % and less than 70 wt % of a metal dip-coat powder, based on a total weight of the dip-coat binder solution, the metal dip-coat powder having a median particle size distribution greater than or equal to 0.5 µm and less than or equal to 30 µm; and
greater than 30 wt % of a non-reactive dip-coat binder,
wherein the non-reactive dip-coat binder comprises a thermoplastic polymer,
wherein the thermoplastic polymer is selected from the group consisting of polyvinyl alcohol (PVA), polyacrylic acid (PAA), derivatives thereof, and combinations thereof,
wherein the thermoplastic polymer has an average molecular weight greater than or equal to 7,000 g/mol and less than or equal to 50,000 g/mol; and
wherein the dip-coat binder solution has a viscosity greater than or equal to 1 cP and less than or equal to 40 cP, as measured using a rheometer according to ASTM E3116.

2. The dip-coat binder solution of claim 1, wherein the dip-coat binder solution comprises greater than or equal to 30 wt % and less than 70 wt % of the metal dip-coat powder, based on a total weight of the dip-coat binder solution.

3. The dip-coat binder solution of claim 1, wherein the metal dip-coat powder has a median particle size distribution greater than or equal to 1 µm and less than or equal to 25 µm.

4. The dip-coat binder solution of claim 1, wherein the metal dip-coat powder comprises a stainless steel alloy, a nickel alloy, a copper alloy, a copper-nickel alloy, a cobalt-chrome alloy, a titanium alloy, an aluminum alloy, a tungsten alloy, or a combination thereof.

5. The dip-coat binder solution of claim 1, wherein the dip-coat binder solution has a viscosity greater than or equal to 3 cP and less than or equal to 40 cP, as measured using a rheometer according to ASTM E3116.

6. The dip-coat binder solution of claim 1, wherein a weight ratio of the metal dip-coat powder to the non-reactive dip-coat binder is greater than or equal to 1:4 and less than or equal to 3:1.

* * * * *